US 7,486,294 B2

(12) United States Patent
Beda et al.

(10) Patent No.: US 7,486,294 B2
(45) Date of Patent: Feb. 3, 2009

(54) VECTOR GRAPHICS ELEMENT-BASED MODEL, APPLICATION PROGRAMMING INTERFACE, AND MARKUP LANGUAGE

(75) Inventors: Joseph S. Beda, Seattle, WA (US);
Kevin T. Gallo, Woodinville, WA (US);
Adam M. Smith, Kirkland, WA (US);
Gilman K. Wong, Redmond, WA (US);
Sriram Subramanian, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 190 days.

(21) Appl. No.: 10/401,717

(22) Filed: Mar. 27, 2003

(65) Prior Publication Data

US 2004/0189667 A1    Sep. 30, 2004

(51) Int. Cl.
*G06T 15/70* (2006.01)
*G06F 15/00* (2006.01)
*G09G 5/00* (2006.01)

(52) U.S. Cl. .................... 345/473; 345/501; 345/581
(58) Field of Classification Search ......... 345/473–475, 345/419–420, 581, 501; 715/500, 513, 517
See application file for complete search history.

(56) References Cited

U.S. PATENT DOCUMENTS

| | | | |
|---|---|---|---|
| 5,261,041 A | 11/1993 | Susman | 395/152 |
| 5,487,172 A | 1/1996 | Hyatt | 395/800 |
| 5,500,933 A | 3/1996 | Schnorf | 395/154 |
| 5,509,115 A | 4/1996 | Butterfield | |
| 5,553,222 A | 9/1996 | Milne | 395/154 |
| 5,555,368 A | 9/1996 | Orton | 395/157 |
| 5,727,141 A | 3/1998 | Hoddie | |
| 5,745,761 A | 4/1998 | Celi | |
| 5,752,029 A | 5/1998 | Wissner | |
| 5,790,130 A | 8/1998 | Gannett | |
| 5,852,449 A | 12/1998 | Esslinger | 345/473 |
| 5,920,325 A | 7/1999 | Morgan | 345/473 |

(Continued)

FOREIGN PATENT DOCUMENTS

WO    WO99/00725 A    1/1999

(Continued)

OTHER PUBLICATIONS

SVG  specificatin—http://www.w3.org/TR/SVG/2003/REC-SVG11-20030114.*

(Continued)

*Primary Examiner*—Rayn R Yang
(74) *Attorney, Agent, or Firm*—Workman Nydegger

(57) ABSTRACT

An element object model and a vector graphics markup language for using that element object model in a manner that allows program code developers to consistently interface with a scene graph data structure to produce graphics. The vector graphics element object model generally corresponds to shape elements and other elements including image and video elements that correlate with a scene graph object model of the scene graph. Markup may be parsed into data including elements in an element tree that is translated into the objects of a scene graph data structure. Other markup may be translated directly into data and calls that create the scene graph objects. The markup language provides distinct ways to describe an element, including a simple string format or complex property syntax, which may be named, enabling reuse in other locations in the markup.

27 Claims, 21 Drawing Sheets

U.S. PATENT DOCUMENTS

| | | | | |
|---|---|---|---|---|
| 5,930,810 | A | 7/1999 | Farros | 707/506 |
| 5,936,632 | A | 8/1999 | Cunniff | |
| 5,986,667 | A | 11/1999 | Jevans | 345/433 |
| 5,986,675 | A | 11/1999 | Anderson | 345/473 |
| 5,987,627 | A | 11/1999 | Rawlings | |
| 6,014,139 | A | 1/2000 | Watson | 345/339 |
| 6,075,532 | A | 6/2000 | Colleran | 345/340 |
| 6,092,107 | A * | 7/2000 | Eleftheriadis et al. | 709/217 |
| 6,115,713 | A | 9/2000 | Pascucci | |
| 6,154,215 | A | 11/2000 | Hopcroft | 345/418 |
| 6,160,907 | A | 12/2000 | Robotham | |
| 6,195,694 | B1 * | 2/2001 | Chen et al. | 709/220 |
| 6,215,495 | B1 * | 4/2001 | Grantham et al. | 345/419 |
| 6,237,092 | B1 | 5/2001 | Hayes, Jr. | 713/100 |
| 6,243,856 | B1 * | 6/2001 | Meyer et al. | 717/146 |
| 6,259,451 | B1 | 7/2001 | Tesler | 345/419 |
| 6,266,053 | B1 | 7/2001 | French | 345/302 |
| 6,272,650 | B1 * | 8/2001 | Meyer et al. | 714/38 |
| 6,275,857 | B1 | 8/2001 | McCartney | 709/226 |
| 6,314,470 | B1 | 11/2001 | Ward | 709/328 |
| 6,377,263 | B1 * | 4/2002 | Falacara et al. | 345/473 |
| 6,411,297 | B1 * | 6/2002 | Tampieri | 345/426 |
| 6,487,565 | B1 | 11/2002 | Schechter | 707/500.1 |
| 6,538,656 | B1 | 3/2003 | Cheung | 345/519 |
| 6,570,578 | B1 | 5/2003 | Smirnov | |
| 6,631,403 | B1 | 10/2003 | Deutsch | |
| 6,654,931 | B1 | 11/2003 | Haskell | |
| 6,675,230 | B1 * | 1/2004 | Lewallen | 719/328 |
| 6,707,456 | B1 | 3/2004 | Marrin | 345/473 |
| 6,714,201 | B1 | 3/2004 | Grinstein | 345/474 |
| 6,717,599 | B1 | 4/2004 | Olano | 345/853 |
| 6,731,314 | B1 | 5/2004 | Cheng | 345/848 |
| 6,732,109 | B2 * | 5/2004 | Lindberg et al. | 707/101 |
| 6,741,242 | B1 * | 5/2004 | Itoh et al. | 345/419 |
| 6,751,655 | B1 * | 6/2004 | Deutsch et al. | 709/219 |
| 6,765,571 | B2 | 7/2004 | Sowizral | 345/420 |
| 6,833,840 | B2 | 12/2004 | Lifshitz | |
| 6,919,891 | B2 | 7/2005 | Schneider | 345/440 |
| 6,986,101 | B2 | 1/2006 | Cooper | 707/513 |
| 7,012,606 | B2 | 3/2006 | Swedberg | 345/420 |
| 7,055,092 | B2 | 5/2006 | Yardumian | 715/513 |
| 7,064,766 | B2 | 6/2006 | Beda | 345/557 |
| 7,069,503 | B2 | 6/2006 | Tanimoto | 715/513 |
| 7,076,332 | B2 | 7/2006 | Cifra | 700/245 |
| 7,088,374 | B2 | 8/2006 | David | 345/420 |
| 7,102,651 | B1 | 9/2006 | Louveaux et al. | |
| 7,103,581 | B1 | 9/2006 | Suen | |
| 7,103,873 | B2 | 9/2006 | Tanner | 717/109 |
| 7,126,606 | B2 | 10/2006 | Beda | 345/473 |
| 7,143,339 | B2 | 11/2006 | Weinberg | 707/509 |
| 7,161,599 | B2 | 1/2007 | Beda | 345/418 |
| 2001/0000962 | A1 * | 5/2001 | Rajan | 345/302 |
| 2002/0019844 | A1 | 2/2002 | Kurowski | |
| 2002/0032697 | A1 * | 3/2002 | French et al. | 707/500.1 |
| 2002/0038451 | A1 * | 3/2002 | Tanner et al. | 717/105 |
| 2002/0046394 | A1 * | 4/2002 | Do et al. | 717/108 |
| 2002/0063704 | A1 * | 5/2002 | Sowizral et al. | 345/419 |
| 2002/0075257 | A1 * | 6/2002 | Chartier et al. | 345/419 |
| 2002/0089508 | A1 * | 7/2002 | Sowizral et al. | 345/522 |
| 2002/0116417 | A1 | 8/2002 | Weinberg et al. | 707/517 |
| 2003/0005045 | A1 | 1/2003 | Tanimoto | 709/203 |
| 2003/0028540 | A1 * | 2/2003 | Lindberg et al. | 707/100 |
| 2003/0028901 | A1 * | 2/2003 | Shae et al. | 725/146 |
| 2003/0110297 | A1 | 6/2003 | Tabatabai et al. | 709/246 |
| 2003/0120823 | A1 * | 6/2003 | Kim et al. | 709/310 |
| 2003/0121000 | A1 * | 6/2003 | Cooper et al. | 715/513 |
| 2003/0126557 | A1 | 7/2003 | Yardumian et al. | 715/513 |
| 2003/0132937 | A1 | 7/2003 | Schneider et al. | 345/473 |
| 2003/0139848 | A1 | 7/2003 | Cifra et al. | 700/245 |
| 2003/0194207 | A1 | 10/2003 | Chung | |
| 2003/0210267 | A1 | 11/2003 | Kylberg | |
| 2004/0015740 | A1 * | 1/2004 | Dautelle | 714/37 |
| 2004/0039496 | A1 * | 2/2004 | Dautelle | 701/3 |
| 2004/0093604 | A1 | 5/2004 | Demsey et al. | 719/310 |
| 2004/0110490 | A1 * | 6/2004 | Steele et al. | 455/412.1 |
| 2004/0189645 | A1 | 9/2004 | Beda et al. | 345/473 |
| 2004/0189669 | A1 | 9/2004 | David et al. | 345/619 |
| 2004/0216139 | A1 * | 10/2004 | Rhoda et al. | 719/320 |
| 2004/0220956 | A1 * | 11/2004 | Dillon | 707/101 |
| 2005/0050471 | A1 | 3/2005 | Hallisey et al. | 715/734 |
| 2005/0060648 | A1 * | 3/2005 | Fennelly et al. | 715/523 |

FOREIGN PATENT DOCUMENTS

WO      WO99/52080 A      10/1999

OTHER PUBLICATIONS

Sun Java documentation, from sun.java.com—"Java Basics, chapter 2, Scene Graph Basics" 2002.*

W3C consortium. "XML Base", W3C recommendation Jun. 27, 2001.*

Walczak, K. and W. Cellary. "Building Database Applications of Virtual Reality with X-VRML". Proc. 7th. Int. Conf. on 3D Web Tech. 2002, SIGGRAPH. pp. 11-120.*

Parr, T. and T. Rohaly. "A language for creating and manipulating VRML." Proc. 1st Symposium on Virtual Reality Modeling Lang. 1995, pp. 123-131.*

Hesina, G.; Schmalstieg, D.; Furhmann, A.; Purgathofer, W. "Distributed Open Inventor: a practical approach to distributed 3D graphics." Proc. ACM Symp. on Virt. Reality Soft. and Tech. 1999, pp. 74-81.□□.*

Strauss, P. and R. Carey. "An Object-Oriented 3D Graphics Toolkit" SIGGRAPH (Proc. 19th Ann. Conf. on Comp. Graph. and Int. Tech.) 1992, pp. 341-349.*

VRML2.0/97 specification, finalized 1997. Scetion 4. □□.*

VRML2.0/97 specificaiton, finalized 1997. Section 6.*

XML specification, version 1.0, W3C recommendation Oct. 6, 2000.*

PCT International Search Report and Written Opinion on application No. PCT/US04/25723.

X3D specification (one section from Google cache), sections 6 and 8—http://www.web3d.org/x3d/specifications/ISO-IEC-19775-IS-X3DAbstractSpecification/....

U.S. Appl. No. 11/555,040, filed Oct. 31, 2006, Beda.

U.S. Appl. No. 11/165,756, filed Jun. 23, 2005, Schneider.

U.S. Appl. No. 11/455,166, filed Jun. 16, 2006, Beda.

U.S. Appl. No. 11/454,719, filed Jun. 16, 2006, Beda.

U.S. Appl. No. 10/693,822, filed Oct. 23, 2003, Blanco.

U.S. Appl. No. 10/401,717, filed Mar. 27, 2003, Beda.

U.S. Appl. No. 10/693,673, filed Oct. 23, 2003, Beda.

U.S. Appl. No. 10/693,633, filed Oct. 23, 2003, Beda.

U.S. Appl. No. 10/693,630, filed Oct. 23, 2003, Subramanian.

U.S. Appl. No. 11/499,257, filed Aug. 4, 2006, David.

PCT Int'l Search Report & Written Opinion on App. No. PCT/US04/25723.

Partial European Search Report in EP 02023604 documents considered relevant.

Australian Search Report, Application No. SG 200302787-7 completed Jan. 12, 2005.

Hyun Suk Kim et al: "Scene Graph for Dynamic Virtual Environment: Spangraph" International Journal of Virtual Reality, IPI Press, Colorado Springs, CO, US, vol. 4, No. 2, 2000, pp. 12-18, OP001039706 ISSN: 1081-1451 *p. 16, col. 2*.

Hudson, S.E. and Stasko, J.T., Animation Support in a User Interface Toolkit: Flexible, Robust, and Reusable Abstractions, ACM SIGGRAPH Symposium on User Interface Software and Technology, Atlanta, GA, 57-67, 1993.

X3D specification (one section from Google cache), sections 6 and 18—http://www.web3d.org/x3dspecifications/ISO-IEC-19775-IS-X3DAbstractSpecification/....

Walczak, K. and W. Cellary. "Building Database Applications of Virtual Reality with X-VRML". Proc. 7th. Int. Conf. on 3D Web Technology. 2002, SIGGRAPH. pp. 11-120. ISBN 1-58113-468-1.

Parr, T. And T. Rohaly. "A language for creating and manipulating VRML." Proc. 1st Symposium on Virtual Reality Modeling Lang. 1995, pp. 123-131.

Hesina, G.; Schmalistieg, D.; Furhmann, A.; Purgathofer, W. "Distributed Open Inventor: a practical approach to distributed 3D graphics," Proc. ACM Symp. On Virt. Reality Soft. And Tech. 1999, pp. 74-81.

Strauss, P. and R. Carey. "An Object-Oriented 3D Graphics Toolkit"SIGGRAPH (Proc. 19th Ann. Conf. on Comp. Graph. And Int. Tech.) 1992, pp. 341-349.

Rikk Cary, Gavin Bell, Chris Marrin: "International Standard iso/iec 14772-1: 1997 Virtual Reality Modeling Language (vrml97)" VRML 97, 1997 pp. 1-236 XP002133320 p. 7, paragraph 3.18: pp. 89-99 section 6.20; p. 149, paragraph B.2.

SVG specification version 1.1, Jan. 14, 2003 all sections. http://www.w3.org/TR/SVG.

Java 3D API Specification: Scene Graph Basics. Sun Microsystems, Inc. 1999. http://java.sun.com/products/java-media/3D/forDevelopers/j3dguide/SceneGraphOverview.doc.html.

SVG Tools, Adobe Illustrator, Jul. 6, 2001—http://web.archive.org/web/20010706131221/http://www.adobe.com/svg/tools/other.html.

Scalable Vector Graphics, Adobe SVG Viewer download area, Nov. 2001—http://www.adobe.com/svg/viewer/install/main.html.

W3C Scalable Vector Graphics (SVG)-History-http://www.w3.org/Graphics/SVG/History.

W3C consortium,/ "XML Base", W3c recommendation Jun. 27, 2001.

Notice of Allowance dated Jul. 2, 2007 cited in related Issued Patent No. 7,265,756 (Copy Attached).

Office Action dated Apr. 4, 2008 cited in related U.S. Appl. No. 11/454,719 (Copy Attached).

Office Action dated Sep. 11, 2007 cited in related U.S. Appl. No. 10/693,822 (Copy Attached).

Office Action dated Nov. 16, 2007 cited in related U.S. Appl. No. 10/693,633 (Copy Attached).

Office Action dated Jul. 17, 2007 cited in related U.S. Appl. No. 10/693,630 (Copy Attached).

Office Action dated Mar. 20, 2008 cited in related U.S. Appl. No. 10/693,630 (Copy Attached).

Office Action dated Oct. 5, 2007 cited in related U.S. Appl. No. 10/693,673 (Copy Attached).

Office Action dated Jan. 10, 2008 cited in related U.S. Appl. No. 10/693,673 (Copy Attached).

Office Action dated Apr. 3, 2008 cited in U.S. Appl. No. 11/499,257 (Copy Attached).

Notice of Allowance dated Apr. 1, 2008 cited in related U.S. Appl. No. 10/693,822 (Copy Attached).

Conal Elliot, Declarative event-oriented programming, Proceedings of the 2nd ACM SIGPLAN international conference on Principles and practice of declaratice programming, pp. 56-67, Sep. 20-23, 2000, Montreal, Quebec, Canada.

* cited by examiner

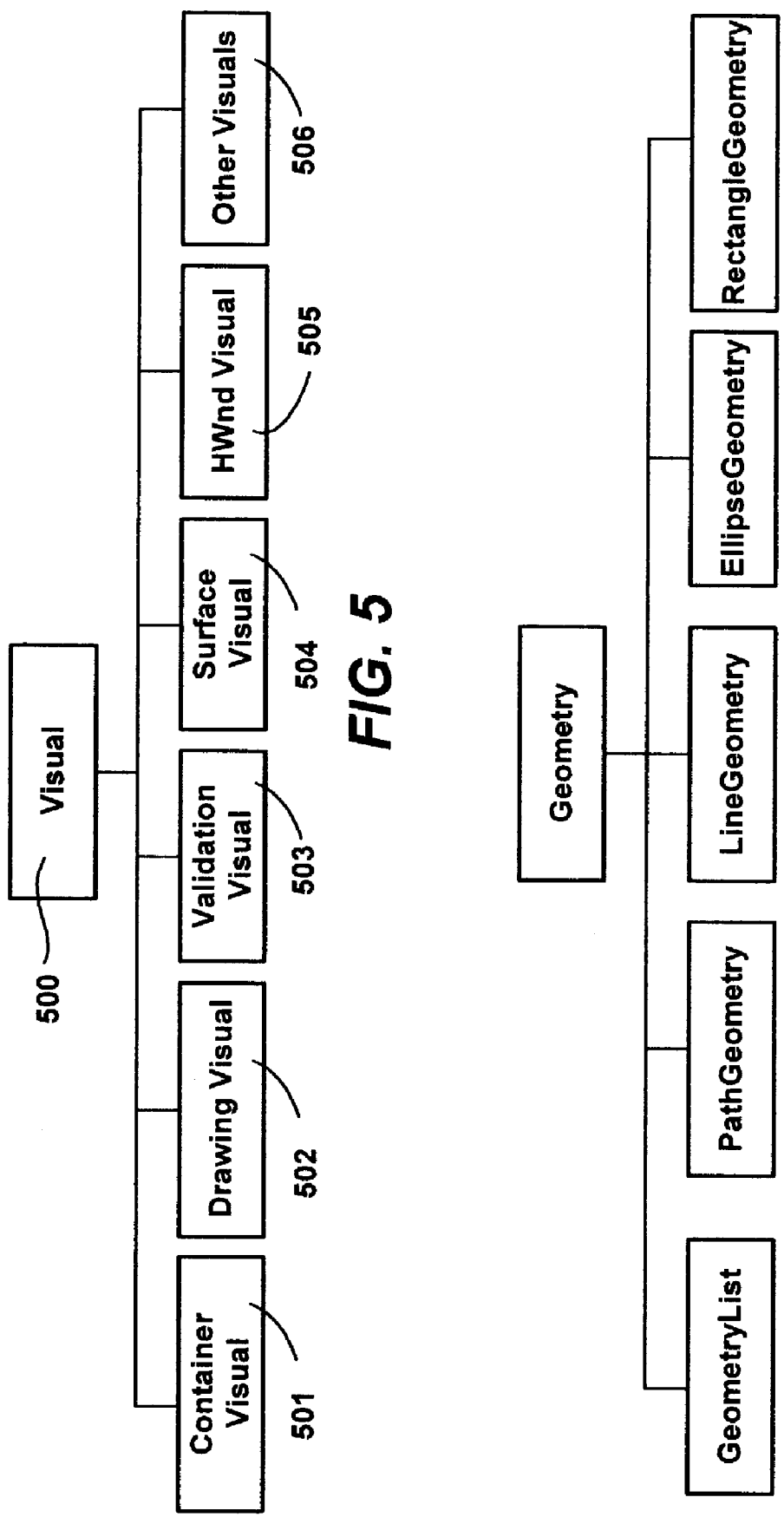

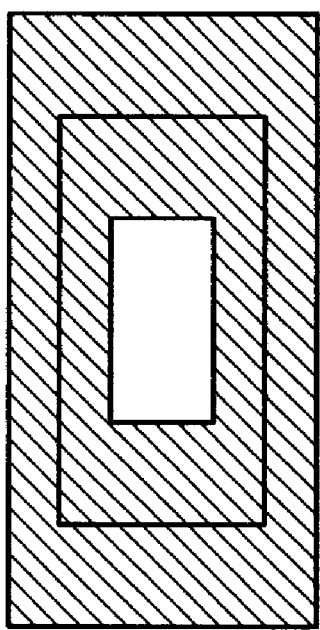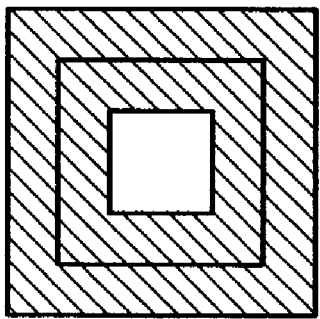
FIG. 8A
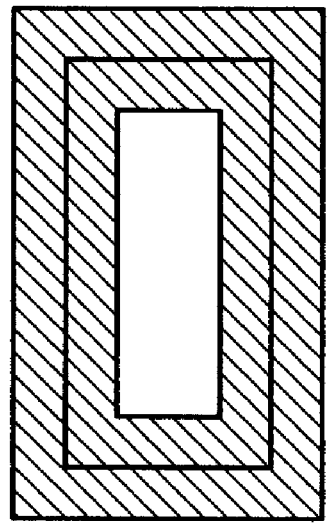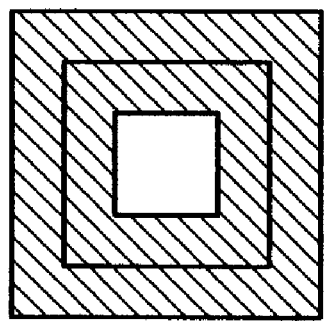
FIG. 8B

VECTOR GRAPHICS ELEMENT-BASED MODEL, APPLICATION PROGRAMMING INTERFACE, AND MARKUP LANGUAGE

CROSS-REFERENCE TO RELATED APPLICATIONS

The present invention is related to the following copending U.S. patent applications: Ser. No. 10/184,795 entitled Multiple-Level Graphics Processing System and Method; Ser. No. 10/184,796, entitled Generic Parameterization for a Scene Graph; Ser. No. 10/185,775 entitled "Intelligent Caching Data Structure for Immediate Mode Graphics;" each filed on Jun. 27, 2002; and United States Patent Application entitled "Visual and Scene Graph Interfaces", filed concurrently herewith. Each related application is assigned to the assignee of the present patent application and hereby incorporated by reference in its entirety.

FIELD OF THE INVENTION

The invention relates generally to computer systems, and more particularly to the processing of graphical and other video information for display on computer systems.

BACKGROUND OF THE INVENTION

The limits of the traditional immediate mode model of accessing graphics on computer systems are being reached, in part because memory and bus speeds have not kept up with the advancements in main processors and/or graphics processors. In general, the current (e.g., WM_PAINT) model for preparing a frame requires too much data processing to keep up with the hardware refresh rate when complex graphics effects are desired. As a result, when complex graphics effects are attempted with conventional graphics models, instead of completing the changes that result in the perceived visual effects in time for the next frame, the changes may be added over different frames, causing results that are visually and noticeably undesirable.

A new model for controlling graphics output is described in the aforementioned U.S. patent application Ser. Nos. 10/184,795, 10/184,796, and 10/185,775. This new model provides a number of significant improvements in graphics processing technology. For example, U.S. Ser. No. 10/184,795 is generally directed towards a multiple-level graphics processing system and method, in which a higher-level component (e.g., of an operating system) performs computationally intensive aspects of building a scene graph, updating animation parameters and traversing the scene graph's data structures, at a relatively low operating rate, in order to pass simplified data structures and/or graphics commands to a low-level component. Because the high-level processing greatly simplifies the data, the low-level component can operate at a faster rate, (relative to the high-level component), such as a rate that corresponds to the frame refresh rate of the graphics subsystem, to process the data into constant output data for the graphics subsystem. When animation is used, instead of having to redraw an entire scene with changes, the low-level processing may interpolate parameter intervals as necessary to obtain instantaneous values that when rendered provide a slightly changed scene for each frame, providing smooth animation.

U.S. Ser. No. 10/184,796 describes a parameterized scene graph that provides mutable (animated) values and parameterized graph containers such that program code that wants to draw graphics (e.g., an application program or operating system component) can selectively change certain aspects of the scene graph description, while leaving other aspects intact. The program code can also reuse already-built portions of the scene graph, with possibly different parameters. As can be appreciated, the ability to easily change the appearance of displayed items via parameterization and/or the reuse of existing parts of a scene graph provide substantial gains in overall graphics processing efficiency.

U.S. Ser. No. 10/185,775 generally describes a caching data structure and related mechanisms for storing visual information via objects and data in a scene graph. The data structure is generally associated with mechanisms that intelligently control how the visual information therein is populated and used. For example, unless specifically requested by the application program, most of the information stored in the data structure has no external reference to it, which enables this information to be optimized or otherwise processed. As can be appreciated, this provides efficiency and conservation of resources, e.g., the data in the cache data structure can be processed into a different format that is more compact and/or reduces the need for subsequent, repeated processing, such as a bitmap or other post-processing result.

While the above improvements provide substantial benefits in graphics processing technology, there still needs to be a way for programs to effectively use this improved graphics model and its other related improvements in a straightforward manner. What is needed is a comprehensive yet straightforward way for programs to take advantage of the many features and graphics processing capabilities provided by the improved graphics model and thereby output complex graphics in an efficient manner.

SUMMARY OF THE INVENTION

Briefly, the present invention provides an element object model and a vector graphics markup language for accessing that element object model in a manner that allows program code developers to consistently interface with a scene graph data structure to produce graphics. The vector graphics markup language comprises an interchange format for expressing vector graphics via the element object model. When interpreted, the markup is parsed into data including elements in an element tree that is translated into the objects of a scene graph data structure. At the element tree level, a property system and presenter system are provided to provide rich programmability features, including inheritance characteristics and eventing, making it straightforward for scene designers to design possibly complex scenes. In general, the vector graphics elements correspond to shape elements and other elements including image and video elements that correlate with scene graph objects of the scene graph object model. The properties and other resources of the vector graphics elements also correlate with similar properties and resources the scene graph object model.

The vector graphics system can thus program to an element level, in which each of the drawing shapes is represented as an element at the same level as the rest of the programmable elements in a page/screen, allowing interaction with the presenter system, events and properties. The vector graphics system also provides a mechanism for programming to a resource level, by which scene designers can essentially shortcut the element tree and presenter system and program directly to the visual API layer that interfaces with the scene graph data structure. This provides a more efficient and lightweight way to output the appropriate object, although losing of some of the programmability of the element level. In one implementation, when a fill of type "visual brush" is programmed, the parser can directly call the API layer with resource level data to create a corresponding visual paint object (which is also a correlation between the element object model and the scene graph object model). In this two-tiered system, element level vector graphics get parsed into created elements, which need later translation to the objects, while resource level vector graphics get parsed and directly stored in an efficient manner. At the same time, the resource level data or the objects created thereby can be referenced by elements and part of the element tree. To this end, elements including visual paint elements may be named. The scene designer thus has the ability to balance efficiency against programmability as needed.

The element class hierarchy includes a shape class, an image class, a video class and a canvas class. Elements of the shape class include rectangle, polyline, polygon, path, line and ellipse. Each element may include or be associated with fill (property) data, stroke data, clipping data, transform data, filter effect data and mask data. Shapes correspond to geometry (of the scene graph object model) that is drawn with inherited and cascaded presentation properties that are used to construct the pen and the brush needed to draw the shapes. The image class is more specific than a shape and can include more raster graphical data, while the video class allows video (or similar multimedia) to be played within a displayed element. The canvas class may act as a container for shapes, to keep shapes lightweight.

In one implementation the markup code is interpreted by a parser/translator which generally adds element-level elements to an element tree/property system and attaches presenters to those elements. The presenter system then takes the element tree with the attached presenters and translates the data to objects (via a builder) and calls to a visual API layer that interfaces with the scene graph and creates the scene graph objects.

The markup language provides distinct ways to describe an element, including a simple string format or a complex object notation (a complex property syntax). For a simple string format, the parser/translator and/or presenter system uses a type converter for converting a string to an appropriate visual API object. When the fill attribute is too complex to fit into a single string, complex property syntax, which may be inline in the markup, is used to describe the property set. Because the same rendering model is shared between the element level and the API level, many of the objects are the same, which makes parsing/translation highly efficient and provides other benefits. A resource instance also may be located elsewhere (e.g., in the markup or a file), and referenced by a name. In this manner, a scene designer can reuse an element in the element tree throughout a scene, including elements described by the complex property syntax.

Other benefits and advantages will become apparent from the following detailed description when taken in conjunction with the drawings, in which:

BRIEF DESCRIPTION OF THE DRAWINGS

FIG. 5 is a representation of a visual class, of an object model, in accordance with an aspect of the present invention;

FIGS. 8A and 8B are representations of transformations of a visual's data in a geometry scale and a non-uniform scale, respectively, in accordance with an aspect of the present invention;

FIG. 12 is a representation of geometry classes of the object model, in accordance with an aspect of the present invention;

DETAILED DESCRIPTION

Exemplary Operating Environment

Figure 1:
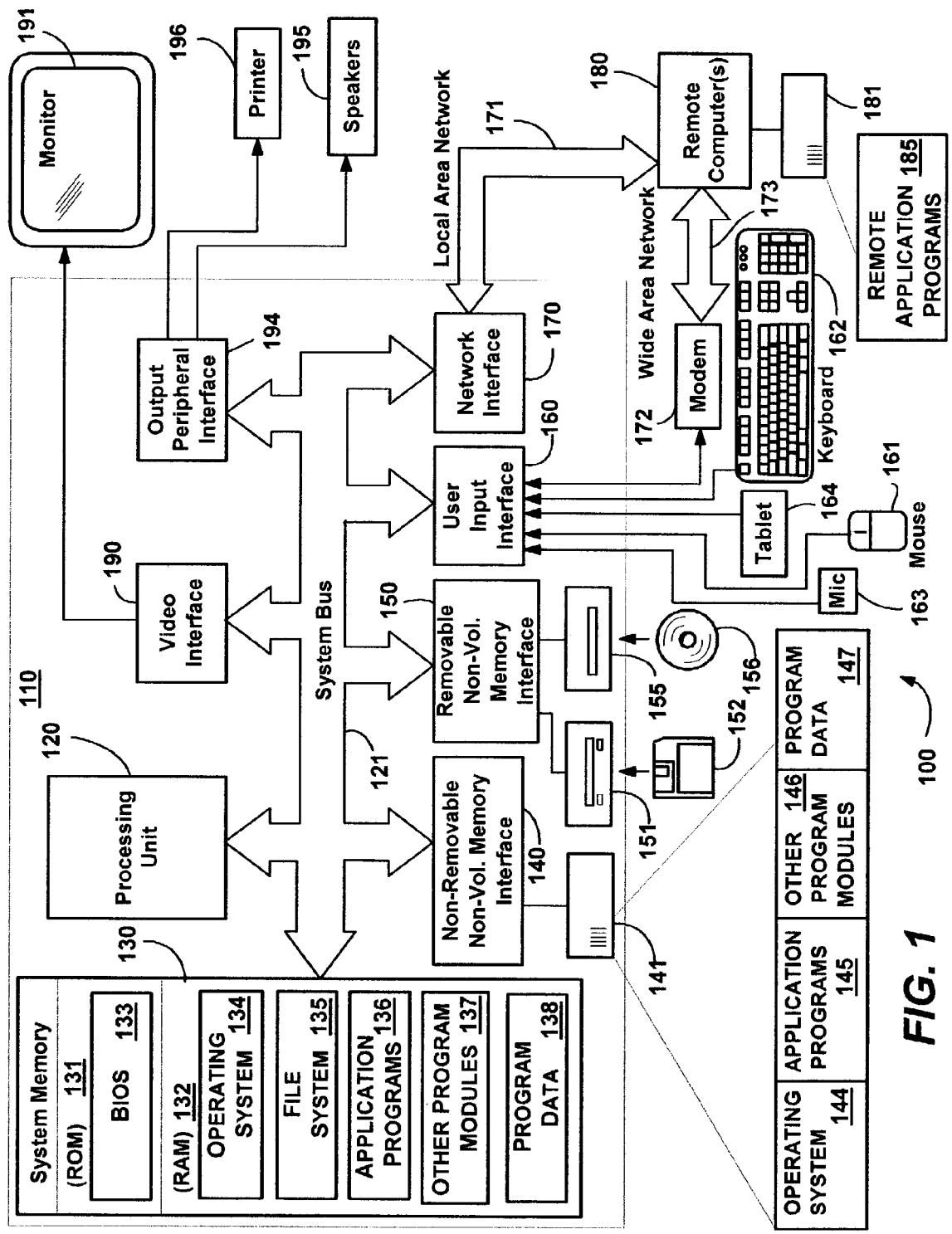
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Graphics Architecture

One aspect of the present invention is generally directed to allowing program code, such as an application or operating system component, to communicate drawing instructions and other information (e.g., image bitmaps) to graphics components in order to render graphical output on the system display. To this end, the present invention provides a markup language along with a set of shape elements and other elements, a grouping and compositing system, and integration with a general property system in an object model to enable programs to populate a scene graph with data structures, drawing primitives (commands), and other graphics-related data. When processed, the scene graph results in graphics being displayed on the screen.

Figure 2:
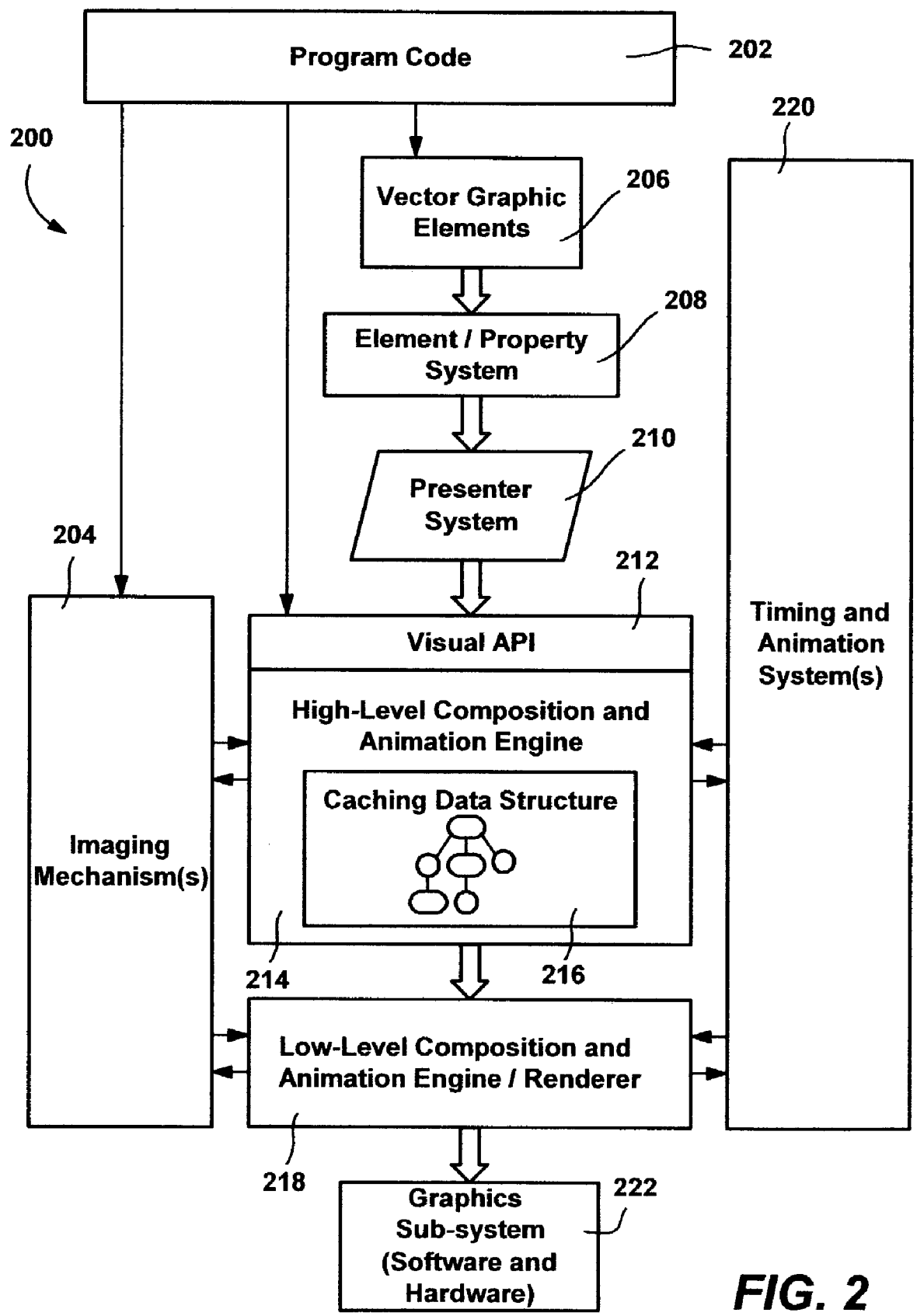
FIG. 2 is a block diagram generally representing a graphics layer architecture into which the present invention may be incorporated.

FIG. 2 represents a general, layered architecture 200 into which the present invention may be implemented. As represented in FIG. 2, program code 202 (e.g., an application program or operating system component or the like) may be developed to output graphics data in one or more various ways, including via imaging 204, via vector graphic elements 206, and/or via function/method calls placed directly to a visual application programming interface (API) layer 212. Direct interaction with the API layer is further described in the aforementioned copending patent application entitled "Visual and Scene Graph Interfaces."

In general, imaging 204 provides the program code 202 with a mechanism for loading, editing and saving images, e.g., bitmaps. These images may be used by other parts of the system, and there is also a way to use the primitive drawing code to draw to an image directly.

In accordance with an aspect of the present invention, vector graphics elements 206 provide another way to draw graphics, consistent with the rest of the object model (as described below). Vector graphic elements 206 may be created via a markup language, which an element/property system 208 and presenter system 210 processes to make appropriate calls to the visual API layer 212. As described below with reference to FIG. 26, in general the vector graphic elements 206 are parsed into objects of the object model from which a scene graph is drawn, which may be provided to the scene graph via an element level via the element/property system 208 and presenter system 210, or may be provided in a more efficient manner at a resource level, as also described below.

In one implementation, the graphics layer architecture 200 includes a high-level composition and animation engine 214, which includes or is otherwise associated with a caching data structure 216. The caching data structure 216 contains a scene graph comprising hierarchically-arranged objects that are managed according to a defined object model, as described below. In general, the visual API layer 212 provides the program code 202 (and the presenter system 210) with an interface to the caching data structure 216, including the ability to create objects, open and close objects to provide data to them, and so forth. In other words, the high-level composition and animation engine 214 exposes a unified media API layer 212 by which developers may express intentions about graphics and media to display graphics information, and provide an underlying platform with enough information such that the platform can optimize the use of the hardware for the program code. For example, the underlying platform will be responsible for caching, resource negotiation and media integration.

In one implementation, the high-level composition and animation engine 214 passes an instruction stream and possibly other data (e.g., pointers to bitmaps) to a fast, low-level compositing and animation engine 218. As used herein, the terms "high-level" and "low-level" are similar to those used in other computing scenarios, wherein in general, the lower a software component is relative to higher components, the closer that component is to the hardware. Thus, for example, graphics information sent from the high-level composition and animation engine 214 may be received at the low-level compositing and animation engine 218, where the information is used to send graphics data to the graphics subsystem including the hardware 222.

The high-level composition and animation engine 214 in conjunction with the program code 202 builds a scene graph to represent a graphics scene provided by the program code 202. For example, each item to be drawn may be loaded with drawing instructions, which the system can cache in the scene graph data structure 216. As will be described below, there are a number of various ways to specify this data structure 216, and what is drawn. Further, the high-level composition and animation engine 214 integrates with timing and animation systems 220 to provide declarative (or other) animation control (e.g., animation intervals) and timing control. Note that the animation system allows animate values to be passed essentially anywhere in the system, including, for example, at the element property level 208, inside of the visual API layer 212, and in any of the other resources. The timing system is exposed at the element and visual levels.

The low-level compositing and animation engine 218 manages the composing, animating and rendering of the scene, which is then provided to the graphics subsystem 222. The low-level engine 218 composes the renderings for the scenes of multiple applications, and with rendering components, implements the actual rendering of graphics to the screen. Note, however, that at times it may be necessary and/or advantageous for some of the rendering to happen at higher levels. For example, while the lower layers service requests from multiple applications, the higher layers are instantiated on a per-application basis, whereby is possible via the imaging mechanisms 204 to perform time-consuming or application-specific rendering at higher levels, and pass references to a bitmap to the lower layers.

Scene Graph Object Model

As described below, the rendering model is shared by the higher-level, control-based vector graphics elements 206, and the lower-level objects created by the visual API layer 212 used in the scene graph data structure 216. This provides a significant amount of correlation between the higher-level elements of the present invention, and the lower-level objects. The following describes one implementation of the scene graph object model.

Figure 3:
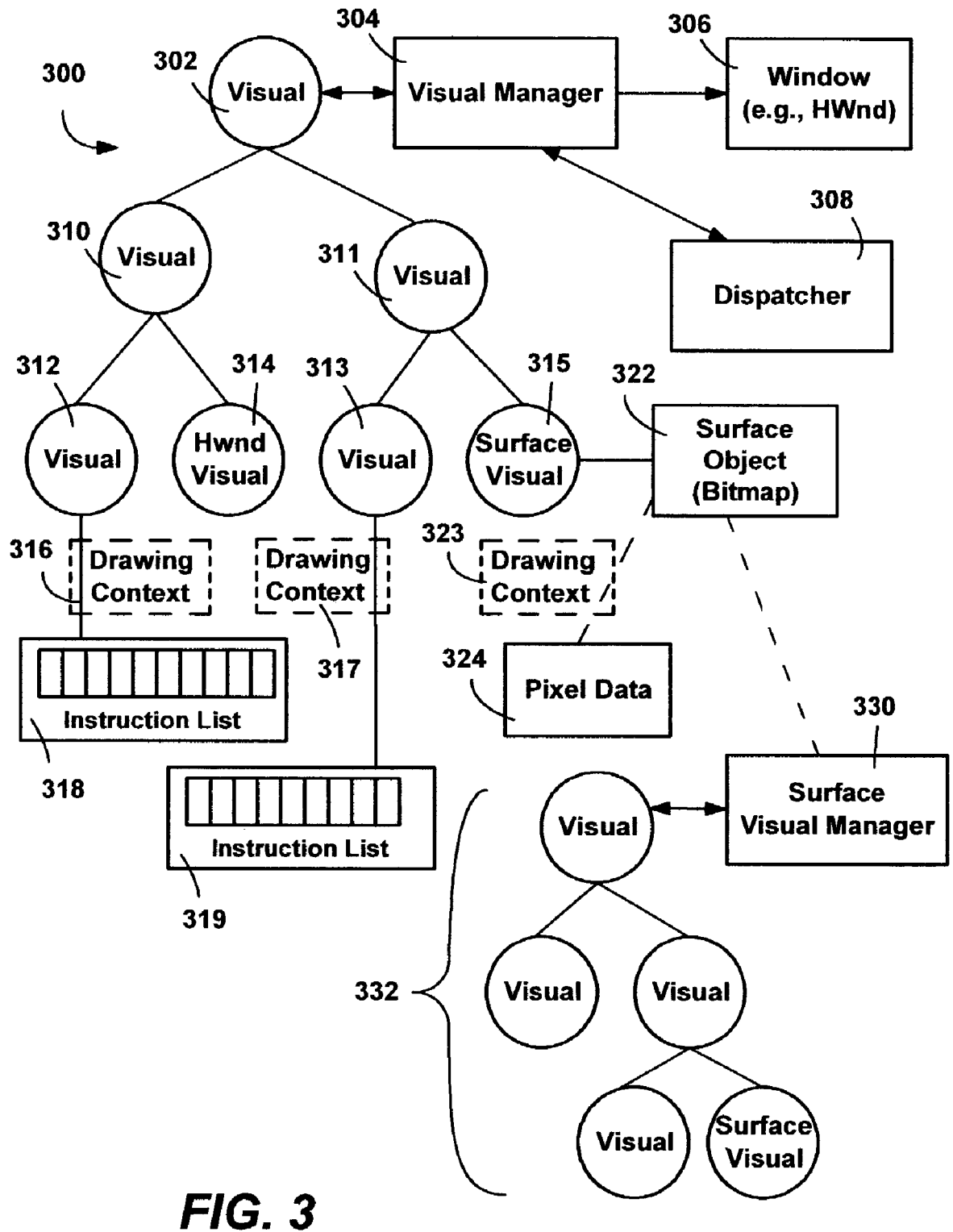
FIG. 3 is a representation of a scene graph of visuals and associated components for processing the scene graph such as by traversing the scene graph to provide graphics commands and other data in accordance with an aspect of the present invention.
Figure 4:
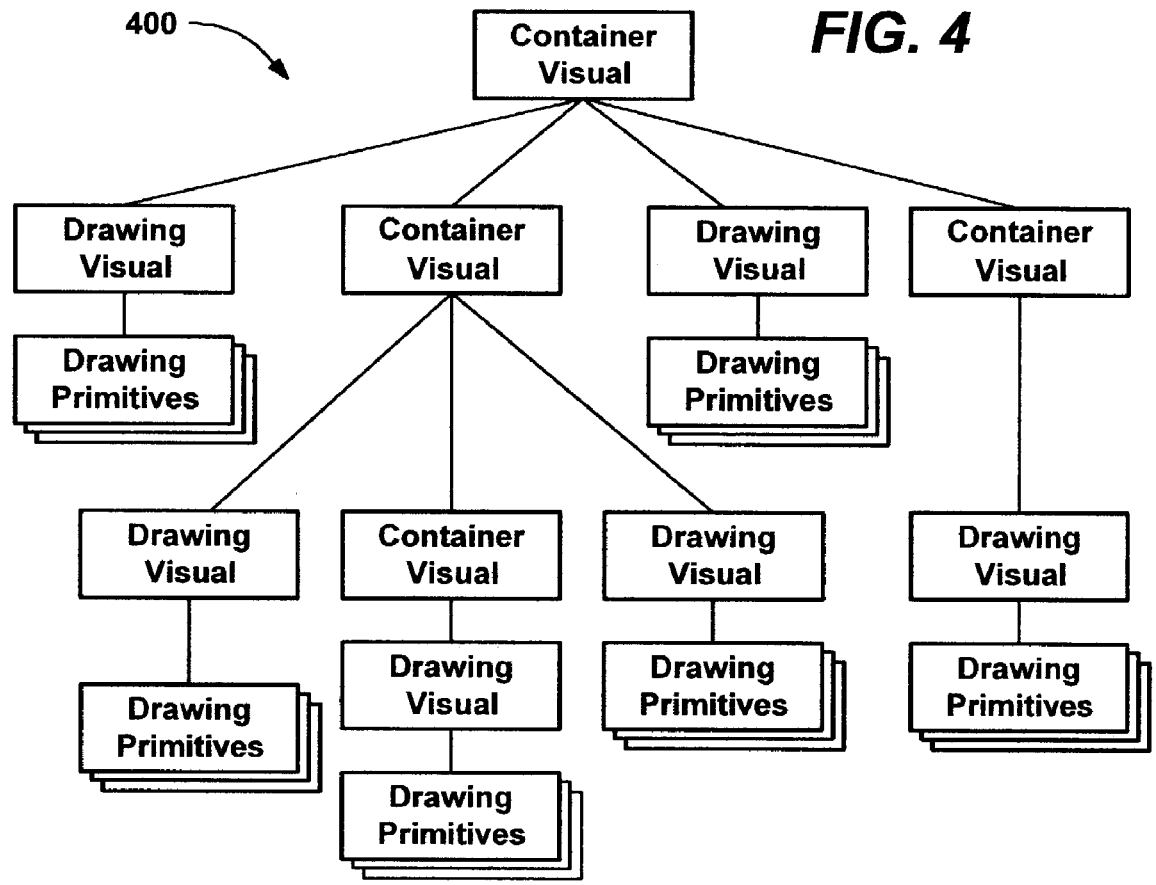
FIG. 4 is a representation of a scene graph of validation visuals, drawing visuals and associated drawing primitives constructed in accordance with an aspect of the present invention.

FIGS. 3 and 4 show example scene graphs 300 and 400, respectively, including a base object referred to as a visual. In general, a visual comprises an object that represents a virtual surface to the user and has a visual representation on the display. As represented in FIG. 5, a base class visual provides the base functionality for other visual types, that is, the visual class 500 is an abstract base class from which visual types (e.g., 501-506) derive.

Figure 6:
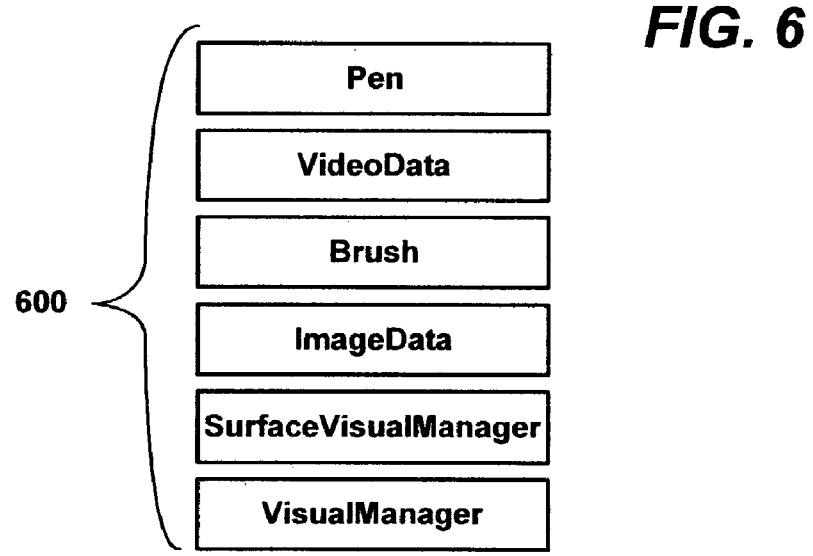
FIG. 6 is a representation of various other objects of the object model, in accordance with an aspect of the present invention.

As represented in FIG. 3, a top-level (or root) visual 302 is connected to a visual manager object 304, which also has a relationship (e.g., via a handle) with a window (HWnd) 306 or similar unit in which graphic data is output for the program code. The VisualManager 304 manages the drawing of the top-level visual (and any children of that visual) to that window 306. FIG. 6 shows the VisualManager as one of a set of other objects 620 in the object model of the graphics system described herein.

To draw, the visual manager 304 processes (e.g., traverses or transmits) the scene graph as scheduled by a dispatcher 308, and provides graphics instructions and other data to the low level component 218 (FIG. 2) for its corresponding window 306, such as generally described in U.S. patent application Ser. Nos. 10/184,795, 10/184,796, and 10/185,775. The scene graph processing will ordinarily be scheduled by the dispatcher 308 at a rate that is relatively slower than the refresh rate of the lower-level component 218 and/or graphics subsystem 222. FIG. 3 shows a number of child visuals 310-315 arranged hierarchically below the top-level (root) visual 302, some of which are represented as having been populated via drawing contexts 316, 317 (shown as dashed boxes to represent their temporary nature) with associated instruction lists 318 and 319, respectively, e.g., containing drawing primitives and other visuals. The visuals may also contain other property information, as shown in the following example visual class:

```
public abstract class Visual : VisualComponent
{
    public Transform Transform { get; set; }
    public float Opacity { get; set; }
    public BlendMode BlendMode { get; set; }
    public Geometry Clip { get; set; }
    public bool Show { get; set; }
    public HitTestResult HitTest(Point point);
    public bool IsDescendant(Visual visual);
    public static Point TransformToDescendant(
        Visual reference,
        Visual descendant,
        Point point);
    public static Point TransformFromDescendant(
        Visual reference,
        Visual descendant,
        Point point);
    public Rect CalculateBounds( ); // Loose bounds
    public Rect CalculateTightBounds( ); //
    public bool HitTestable { get; set; }
    public bool HitTestIgnoreChildren { get; set; }
    public bool HitTestFinal { get; set; }
}
```

Figure 7:
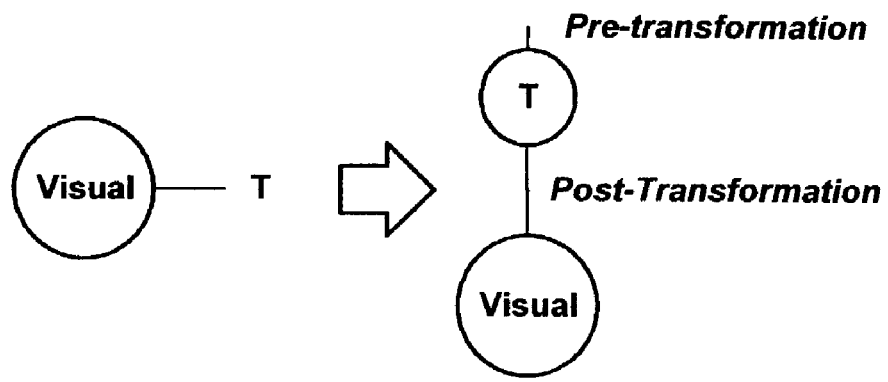
FIG. 7 is a diagram representing transformation of a visual's data in accordance with an aspect of the present invention.

A transformation, set by the transform property, defines the coordinate system for the sub-graph of a visual. The coordinate system before the transformation is called pre-transform coordinate system, the one after the transform is called post-transform coordinate system, that is, a visual with a transformation is equivalent to a visual with a transformation node as a parent. FIG. 7 generally provides an example of transformation, identifying the pre-transformation and post-transformation coordinate systems relative to a visual. To get or set the transformation of a visual, the Transform property may be used.

Note that the coordinate transforms may be applied in a uniform way to everything, as if it were in a bitmap. Note that this does not mean that transformations always apply to bitmaps, but that what gets rendered is affected by transforms equally. By way of example, if the user draws a circle with a round pen that is one inch wide and then applies a scale in the X direction of two to that circle, the pen will be two inches wide at the left and right and only one inch wide at the top and bottom. This is sometimes referred to as a compositing or bitmap transform (as opposed to a skeleton or geometry scale that affects the geometry only). FIG. 8A is a representation of scaling transformation, with a non-transformed image 800 appearing on the left and a transformed image 802 with a non-uniform scale appearing on the right. FIG. 8B is a representation of scaling transformation, with the non-transformed image 800 appearing on the left and a transformed image 804 with geometry scaling appearing on the right.

With respect to coordinate transformation of a visual, TransformToDescendant transforms a point from the reference visual to a descendant visual. The point is transformed from the post-transformation coordinate space of the reference visual to the post-transformation coordinate space of the descendant visual. TransformFromDescendant transforms a point from the descendant visual up the parent chain to the reference visual. The point is transformed from post-transformation coordinate space of the descendant visual to post-transformation coordinate space of the reference visual. The CalculateBounds method returns the bounding box of the content of the Visual in Post-Transformation coordinate space. Note that there may be an alternative version of the API where more specific specifications are allowed as to how the transform on a visual is interpreted during a coordinate transformation. For example, the transform on the reference and descendant visual may or may not be taken into account. In this alternative, there are thus four options, e.g., coordinates can be transformed from pre-transformation to pre-transformation space, pre-transformation to post-transformation space, post-transformation to pre-transformation space, and post-transformation to post-transformation space. The same concept applies to hit-testing, e.g., hit-testing may be started in pre-transformation or post-transformation transform coordinate space, and the hit-test results might be in pre-transformation or post-transformation coordinate space.

The clip property sets (and gets) the clipping region of a visual. Any Geometry (the geometry class is described below with reference to FIG. 12) can be used as a clipping region, and the clipping region is applied in Post-Transformation coordinate space. In one implementation, a default setting for the clipping region is null, i.e., no clipping, which can be thought of as an infinite big clipping rectangle from $(-\infty, -\infty)$ to $(+\infty, +\infty)$ The Opacity property gets/sets the opacity value of the visual, such that the content of the visual is blended on the drawing surface based on the opacity value and the selected blending mode. The BlendMode property can be used to set (or get) the blending mode that is used. For example, an opacity (alpha) value may be set between 0.0 and 1.0, with linear alpha blending set as the mode, e.g., Color=alpha*foreground color+(1.0-alpha)*background color). Other services, such as special effects properties, may be included in a visual, e.g., blur, monochrome, and so on.

The various services (including transform, opacity, clip) can be pushed and popped on a drawing context, and push/pop operations can be nested, as long as a pop call matches a push call. For example PushTransform( . . . ); PushOpacity ( . . . ); PopTransform( . . . ); is illegal, because before the PopTransform call, PopOpacity needs to be called.

The PushTransform method pushes a transformation. Subsequent drawing operations are executed with respect to the pushed transformation. The PopTransform pops the transformation pushed by the matching PushTransform call:

```
void PushTransform(Transform transform);
void PushTransform(Matrix matrix);
void PopTransform( );.
```

Similarly, the PushOpacity method pushes an opacity value. Subsequent drawing operations are rendered on a temporary surface with the specified opacity value and then composite into the scene. PopOpacity pops the opacity pushed by the matching PushOpacity call:

```
void PushOpacity(float opacity);
void PushOpacity(NumberAnimationBase opacity);
void PopOpacity( );.
```

The PushClip method pushes a clipping geometry. Subsequent drawing operations are clipped to the geometry. The clipping is applied in post transformation space. PopClip pops the clipping region pushed by the matching PushClip call:

```
void PushClip(Geometry clip);
void PopClip( );.
```

Note that push operations can be arbitrarily nested as long as the pop operations are matched with a push. For example, the following is valid:

```
PushTransform(...);
DrawLine(...);
PushClip(...);
DrawLine(...);
PopClip( );
PushTransform(...);
DrawRect(...);
PopTransform( );
PopTransform( );
```

Hit-testing is performed in the Post-Transformation coordinate space, and returns an identity of each hit-testable visual that is hit, e.g., when a pen or mouse click is detected. An alternate version of the interface may allow for hit-testing to start at a Pre-Transformation coordinate space relative to the visual where the hit test is started. Visuals that are hit are returned in right-to-left, depth-first order. Hit-testing may be controlled with various flags, including HitTestable, which determines if the visual is hit-testable (the default is true), and HitTestFinal, which determines if hit-testing stops when the visual is hit, i.e. if a Visual is hit and the HitTestFinal property of the visual is true, hit-testing aborts and returns the results collected up to this point (the default is false). Another flag is HitTestIgnoreChildren, which determines if the children of a visual should be considered when hit-testing is performed on a visual (the default is false).

A ProxyVisual is a visual that may be added more than once into the scene graph. Since any visual referred to by a ProxyVisual may be reached by multiple paths from the root, read services (TransformToDescendent, TransformFromDescendent and HitTest) do not work through a ProxyVisual. In essence, there is one canonical path from any visual to the root of the visual tree and that path does not include any ProxyVisuals.

As represented in FIG. 5, various types of visuals are defined in the object model, including ContainerVisuals 501, DrawingVisuals 502, ValidationVisuals 503, SurfaceVisuals 504 and HwndVisuals 505. The table below sets forth example methods of a DrawingVisual:

```
public class DrawingVisual : Visual
{
    public DrawingVisual( );
    public IDrawingContext Open( );
    public IDrawingContext Append( );
}
```

A DrawingVisual is a container for graphical content (e.g. lines, text, images, and so forth). Note that it is possible to add a Visual into a DrawingVisual, but in some implementations this is not allowed. The DrawingVisual 502 includes an Open method, which returns an IDrawingContext that can be used to populate the DrawingVisual, e.g., with other visuals and drawing primitives, as described below. In one implementation, for various reasons also described below, a DrawingVisual may be only opened once to populate its drawing context; in other words, such a DrawingVisual is immutable. After the DrawingVisual has been populated, the DrawingVisual is closed using a Close method, e.g., on the drawing context. Note that an Open call may clear any contents (children) of a visual, however in one alternative implementation, there is provided an Append method, to open a current visual in a manner that appends to that visual. In other words, an OpenForAppend call works like Open, except the current content of the DrawingVisual is not cleared out on the open.

The following is an example of how a drawing context is used to populate a visual:

```
ContainerVisual cv1 = new ContainerVisual( );
DrawingVisual dv1 = new DrawingVisual( );
// Open a drawing context.  The context
// will automatically be closed when
// exiting the using block.  This will also
// replace any contents that might already
// be in dv1.
using (IDrawingContext dc = dv1.Open( ))
{
    dc.DrawLine(new Pen(Brushes.Blue), new Point(...),
    new Point(...));
}
// Add dv1 to the child collection of cv1
cv1.Children.Add(dv1);
// Add another arbitrary visual to cv1
cv1.Children.Add(someOtherVisual);
// Create another DrawingVisual
DrawingVisual dv2 = new DrawingVisual( );
using (IDrawingContext dc = dv2.Open( ))
{
    // This sets up a new coordinate system
    // where everything is twice as big
    dv.PushTransform(new Scale(2.0, 2.0));
    // This line is drawn in the new scaled
    // coordinate system.
    dc.DrawLine(new Pen(Brushes.Red), new Point(...),
    new Point(...));
    // This reverts to the original coordinate system.
    dv.PopTransform( );
    dc.DrawLine(new Pen(Brushes.Green), new Point(...),
    new Point(...));
}
// Add dv2 to the child collection of cv1;
cv1.Children.Add(dv2);
```

In general, a ValidationVisual 503 is conceptually similar to a DrawingVisual, except that a ValidationVisual is populated when the system requests that it be filled, instead of when the program code wants to populate it. For example, as described in U.S. Ser. No. 10/185,775, the high-level composition and animation engine 214 (FIG. 2) may invalidate scene graph data as resources are needed, such as when part of a scene graph is not visible. For example if some parts are scrolled off the display, clipped, and so on. If the invalidated scene graph data is later needed, the program code 202 called will be called back to redraw (validate) the invalidated portion of the scene graph. To this end, one typical usage scenario is for a program code to subclass the ValidationVisual and override the OnValidate method. When the system calls the OnValidate method, a drawing context is passed in, and the program the uses the drawing context repopulate the ValidationVisual.

The example below shows one way to implement a simple ValidationVisual, e.g., one that draws a line with a certain color. The color of the line can be changed by calling SetColor. To force the update of the ValidationVisual, SetColor calls Invalidate to force the graphics sub-system to revalidate the ValidationVisual:

```
public class MyValidationVisual : ValidationVisual
{
    public override void OnValidate(IDrawingContext dc)
    {
        dc.DrawLine(m_color, ...);
    }
    public void SetColor(Color newColor)
    {
        m_color = color;
        Invalidate( );      // Force a redraw of the ValidationVisual to
                            // reflect the color change.
    }
    private Color m_color
}
```

This example shows how to use the ValidationVisual:

```
MyValidationVisual myVV = new MyValidationVisual( );
container.Children.Add(myW);
myVV.SetColor(new Color(...));
```

FIG. 4 shows an example scene graph 400 in which ContainerVisuals and DrawingVisuals are related in a scene graph, and have associated data in the form of drawing primitives, (e.g., in corresponding drawing contexts). The ContainerVisual is a container for Visuals, and ContainerVisuals can be nested into each other. The children of a ContainerVisual can be manipulated with a VisualCollection returned from a Children property of the VisualContainer. The order of the Visuals in the VisualCollection determines in which order the Visuals are rendered, i.e. Visuals are rendered from the lowest index to the highest index from back to front (painting order). For example, with proper parameters with three drawing visuals representing red, green, and blue rectangles hierarchically under a container visual, the following code would result in three rectangles being drawn (translating to the right and down), a red rectangle in back, a green rectangle in the middle and a blue rectangle in front:

```
VisualCollection vc = m_cv.Children;
vc.Add(new DrawingVisual( ));
vc.Add(new DrawingVisual( ));
vc.Add(new DrawingVisual( ));
for (int i = 0; i < vc.Count; i++)
{
    DrawingVisual v = (DrawingVisual)(vc[i]);
    if (v != null)
    {
        v.Transform = Transform.CreateTranslation(i * 20.0f, i*20f);
        IDrawingContext dc = v.Open( );
        dc.DrawRectangle(
            new Brush(colors[i]),
            null,
```

```
        new Point2D(0, 0),
        new Point2D(100.0f, 100.0f));
    v.Close(dc);
    }
}
```

As represented in FIG. 5, another type of visual object is a SurfaceVisual 504. In general, as represented in FIG. 3, a SurfaceVisual object 315 references an in-memory surface (bitmap) 322 that the program code 202 (FIG. 2) can access. The client program code 202 can supply its own surface memory, or it can request that the memory be allocated by the surface object.

The program code 202 has the option to open a SurfaceVisual and get a drawing context 323, into which the program code 202 can write pixel data 324 or the like and directly put those pixels onto the surface. This is represented in FIG. 3 by the dashed line between the surface object 322, the drawing context 323 (shown as a dashed box to represent its temporary nature) and the pixel data 324.

The program code 202 also has an option to create a surface visual manager 330 and associate a visual subgraph 332 with the SurfaceVisual 315. This option is represented in FIG. 3 by the dashed line between the surface object 322 and the surface visual manager 330. Note that the visual subgraph 332 can also nest other surface visuals, as also shown in FIG. 3. The surface visual manager 330 (also shown as a type of other object in the set 620 of FIG. 6) walks the visual subgraph 332 to update the SurfaceVisual bitmap 322. Further, note that this traversal is scheduled by the dispatcher 308, and for efficiency may be throttled to control how often this bitmap 322 is updated. The surface visual manager 330 does not have to traverse the visual subgraph 322 each time and/or at the same rate that the top level visual manager 302 walks the rest of the scene graph.

Figure 9A:
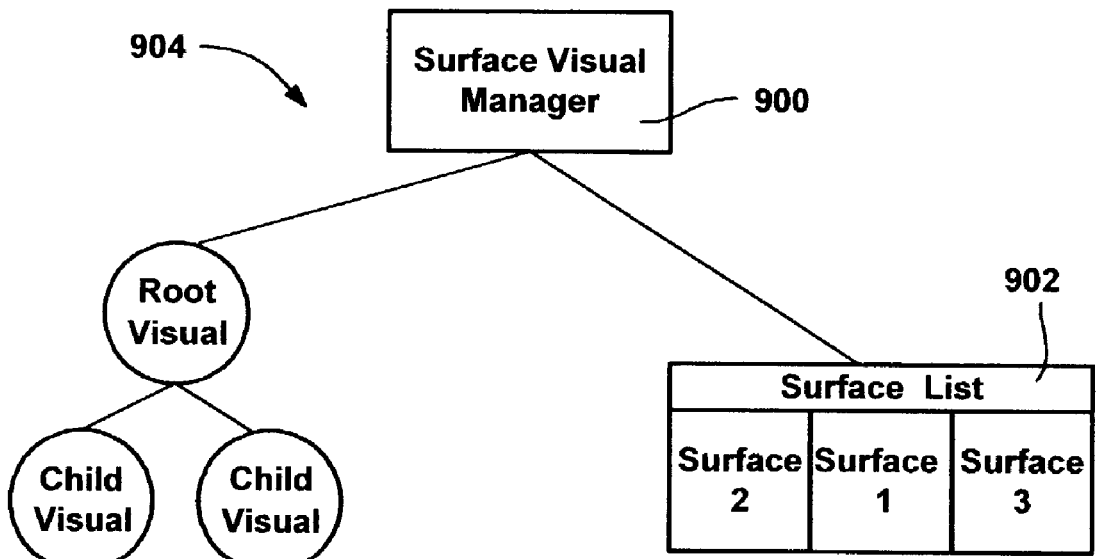
FIGS. 9A-9C are block diagrams of surface visual objects and other visuals and components in accordance with an aspect of the present invention.
Figure 9B:
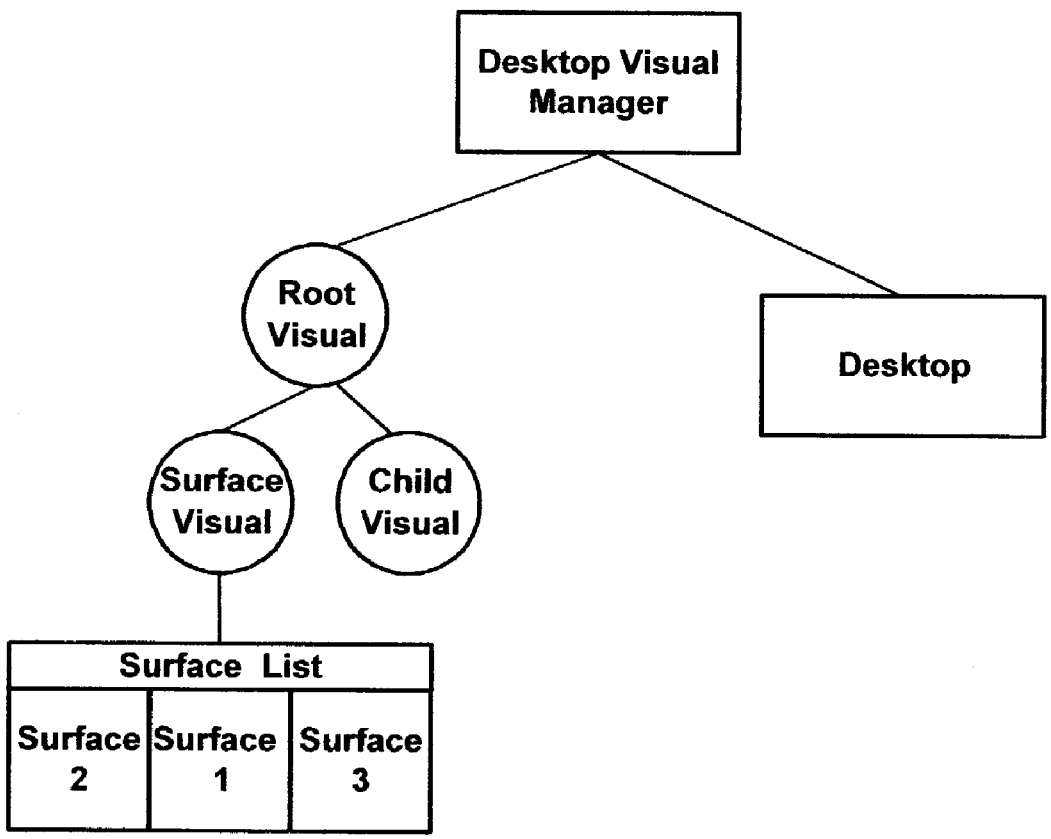

With respect to surfaces, as further described with reference to FIGS. 9A-9C, in general, the present graphics model thus allows compositing a set of visuals to a surface, immediate-mode rendering of vector and bitmap primitives into a surface, compositing a surface onto the desktop or onto another surface, and controlling which surface in a surface list is used to composite into or to draw into. A surface list is defined as a collection of one or more surfaces (i.e. frames/buffers) of physical (system or video) memory used to store compositions of visuals or graphical drawings, or both. One of the surfaces of the surface list may be set as a current back buffer where drawing and/or compositing is done, and one of the surfaces of the surface list is set as a current primary, or front buffer, which is used to composite onto another render target.

Surfaces may be used in a number of ways. By way of example, FIG. 9A shows compositing to a surface. In FIG. 9A, a surface visual manager object 900 connects a surface list 902 as a render target for a visual tree 904. During each compositing cycle, the visuals are composited into the surface of the surface list that is currently serving as the active back buffer for the surface list. The surface being composited to can include a surface owned by the client/high level compositing engine 214 (FIG. 2) for in-process compositing scenarios, a surface owned by the low-level compositing engine 218 for scenarios where the client does not need the bits but the low-level compositing engine 218 needs them to composite the surface onto another render target, or a cross-process surface, for scenarios where the client needs access to the surface bits, but the low-level compositing engine 218 also needs the surface for other compositing work.

The compositing is controlled by a timing service that is attached to the Visual Manager. One example of a timing service, is a manual mode that might be used as in the example below:

```
// create a manual timing service and attach a visual manager
TimingService timingService = new
ManualTimingService(visualManager);
// composite the visual tree to the current back buffer of
the surface
visualManager.Render( );
foreach (Tick tick in timingService)
{
    // advance the back buffer to the next frame of the surface
    surfaceList.NextFrame( );
    // advance the time of the visual tree
    timingService.Tick (tick);
    // composite the visual tree to the current back buffer
    of surface
    visualManager.Render( );
}
```

Another way to use a surface is with immediate-mode rendering to a surface, via a context. Attaching a surface list to a visual (a surface visual) enables immediate-mode rendering to the surface of the surface list that is currently serving as the active back buffer for the surface list. This rendering is done by obtaining a drawing context from the surface visual and executing drawing commands on that context, as described above. Note that obtaining a drawing context locks the surface so that other compositing operations cannot be done to it. Each drawing command is executed immediately, and vectors and other surfaces can be drawn (blended) onto the surface. However, other visuals cannot be drawn onto the surface, but instead can be composited into the surface by associating it with a visual manager, as previously described (e.g., in FIG. 9A).

```
// attach a surface list to a visual
SurfaceVisual surfaceVisual = new SurfaceVisual(surfaceList);
// enable immediate-mode rendering to (and lock) back buffer
surface
BaseDrawingContext dc = surfaceVisual.Open( );
// draw a line (immediately) to the current back buffer of the
surface
dc.DrawLine (pen, startPoint, endPoint);
// unlock the surface - we're done with immediate-mode rendering
surfaceVisual.Close(dc);
```

Another use for surfaces is when compositing a surface onto another render target. To this end, once a surface list is attached to a surface visual, the surface can then be attached as a node in a visual tree, and the surface of the surface list that is currently serving as the primary or front buffer can be composited to another surface or to the desktop. This is illustrated in FIG. 9B and in the example below:

```
// attach a surface list to a visual
SurfaceVisual surfaceVisual = new SurfaceVisual(surfaceList);
// Add the surfaceVisual to a visual tree for compositing onto another
// render target
rootVisual.Add(surfaceVisual);
```

Figure 9C:
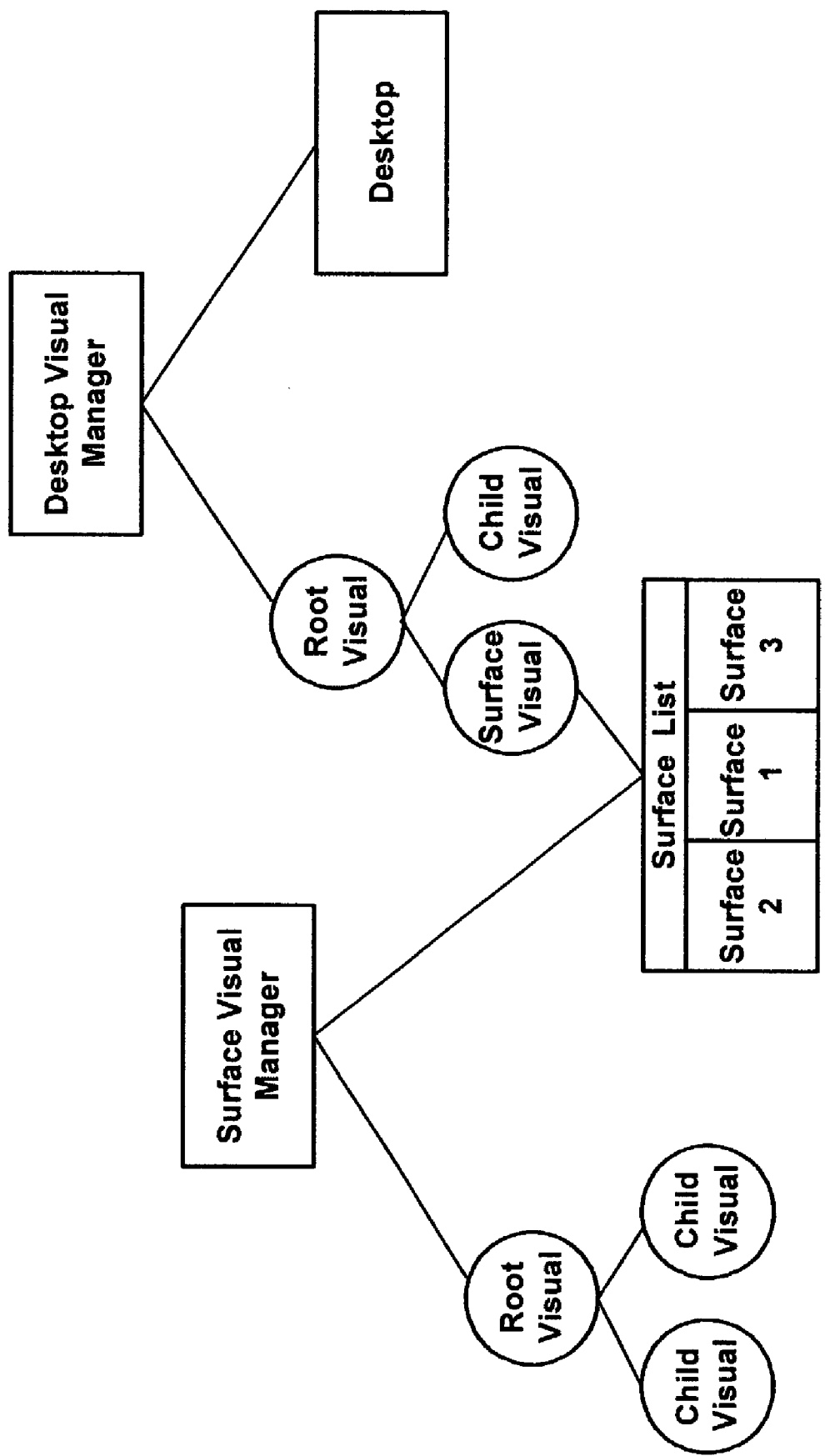

Live composition to/from a surface is represented in FIG. 9C, where the above-described capabilities are combined so that compositing to the back buffer surface of a surface list and compositing from the front buffer surface of a surface list (e.g. to the desktop) happen simultaneously. Note that to eliminate the undesirable video effect known as tearing, the surface list should have at least two surfaces, a front and a back buffer surface. A surface used as in FIG. 9C is likely owned by the low-level engine 218, or is a cross-process surface to make the composition in the low level engine 218 perform better.

Surfaces are constructed as independent objects, as set forth in the examples of constructors below:

```
public class Surface
{
    // create and allocate a blank surface without initial data
    public Surface(int width,
        int height,
        int dpi,
        PixelFormat pixelFormat,
        SurfaceFlags flags)
    // create a surface using the supplied memory
    public Surface (int width,
        int height,
        int dpi,
        PixelFormat pixelFormat,
        IntPtr pixels,   // managed memory for the surface
        Int stride)
    // create from a source (i.e. Clone)
    public Surface(Surface sourceSurface,
        SurfaceFlags flags)
    // Create from File or URL
    public Surface (String filename,
        SurfaceFlags flags)
    // Create from Stream
    public Surface (System.IO.Stream stream,
        SurfaceFlags flags)
    // Create from HBITMAP (which can't be selected into an HDC)
    public Surface (HBITMAP hbitmap, HPALETTE hPalette)
    // Create from HICON
    public Surface (HICON hicon)
    // read-only properties
    public Int Width {get; }
    public Int Height {get; }
    public Int Dpi {get;}
    public PixelFormat Format {get; }
    public int Stride {get; }
    public IntPtr Buffer {get; }
}
public class SurfaceList
{
    // Create a list of blank surfaces (without initial data).
    public SurfaceList (int width,
        int height,
        int dpi,
        PixelFormat pixelFormat,
        int numSurfaces,
        SurfaceFlags flags)
    // Create a SurfaceList that uses the specified surfaces
    // All the surfaces must have identical properties (w, h,
    // dpi, etc).
    public SurfaceList (Surface [ ]surfaces)
    // change the front buffer to the first-in-line back buffer
    public Flip( )
    // advance the back buffer to the next surface
    public Next( )
    public int FrontBufferIndex {get; set;}
    public int BackBufferIndex {get; set;}
    public Surface GetFrontBuffer( )
    public Surface GetBackBuffer( )
    public Surface GetSurface(int surfaceIndex)
}
```

Once constructed, a surface and/or a surface list can be attached to a surface visual object or to a visual manager object.

```
// Create a surface visual
public SurfaceDrawingVisual(Surface surface)
public SurfaceDrawingVisual(SurfaceList surfaceList)
// Create a visual manager with a surface render target
public VisualManager(Surface surface)
public VisualManager(SurfaceList surfaceList)
```

Further, a surface can get data from a decoder, and/or send its data to an encoder for writing to a specific file format. Surfaces can also receive/send data from/to effect interfaces. A surface can be constructed for any pixel format from the full set of supported surface format types. However, some adjustments may be made to the specified pixel format, e.g., if the specified pixel format is less than 32 bits per pixel, then the format will be promoted to 32 bits per pixel. Whenever bits are requested from a surface in the original format, the surface will be copied to a buffer of the requested pixel format using a format conversion filter.

Figure 10A:
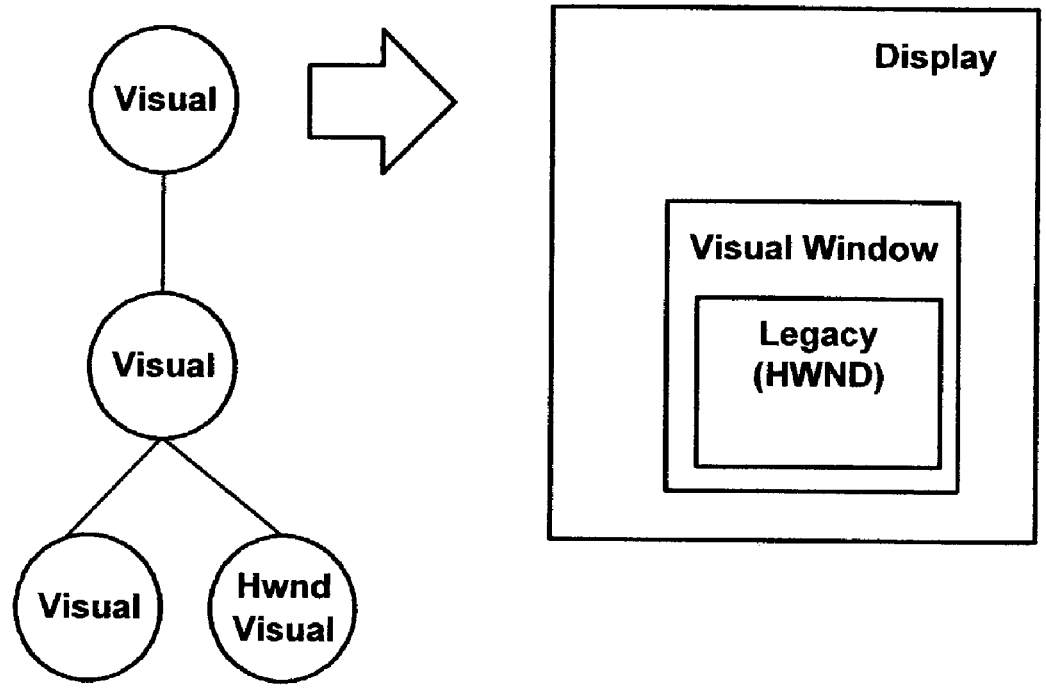
FIGS. 10A and 10B are diagrams representing HWnd visual objects in accordance with an aspect of the present invention.
Figure 10B:
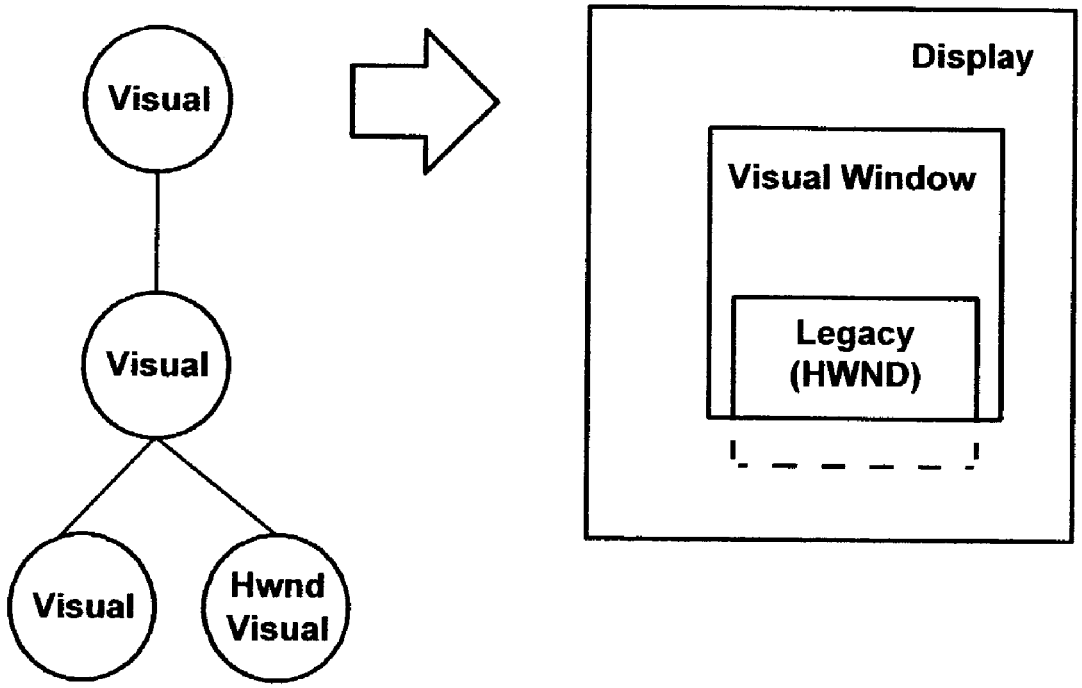

Returning to FIG. 5, yet another visual is an HwndVisual 505, which positions a Win32 child HWnd in the scene graph. More particularly, legacy programs will still operate via the WM_PAINT method (or the like) that draws to a child HWnd (or the like) based on prior graphics technology. To support such programs in the new graphics processing model, the HwndVisual allows the Hwnd to be contained in a scene graph and moved as the parent visual is repositioned, as represented in FIG. 10A. As a result of limitations with existing Hwnds, however, when rendered, a child Hwnd can only be on top of other windows, and cannot be rotated or scaled like other visuals described above. Some clipping is possible, as represented in FIG. 10B, where the dashed lines indicate the HWnd's displayed rectangle being clipped during relative movement with respect to its parent visual.

Figure 11:
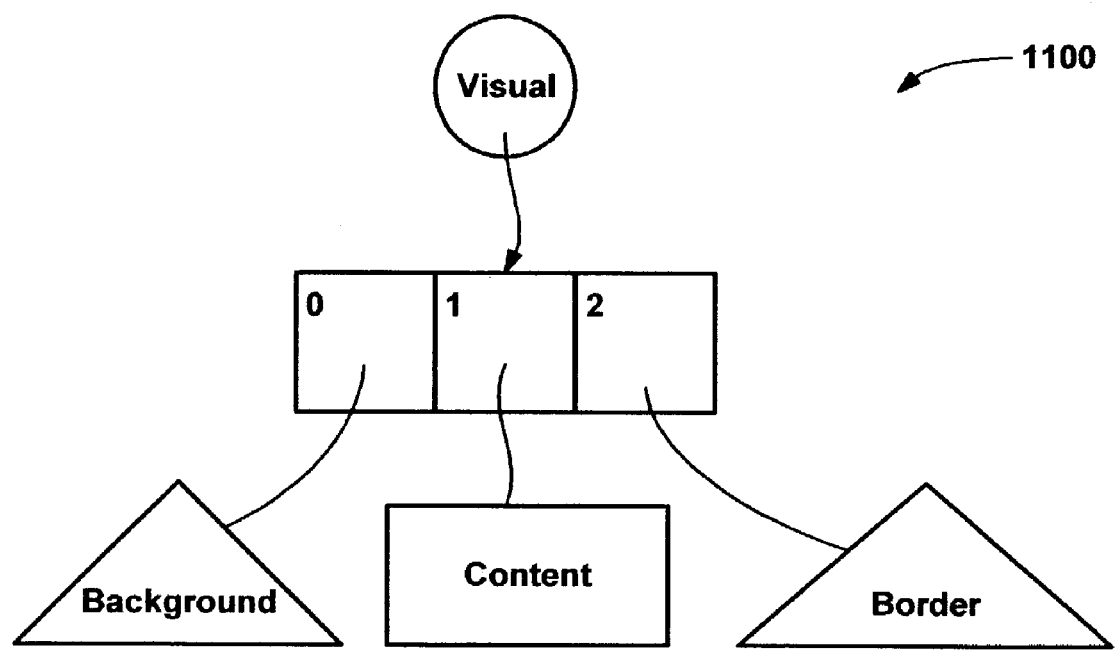
FIG. 11 is a diagram representing a layered visual object in accordance with an aspect of the present invention.

Other types of visuals 506 are also feasible, and the present object model is extensible to allow others to be developed. For example, as represented in FIG. 11, a layered visual 1100 enables an application developer to separately control the information in a visual via multiple data streams, providing a finer granularity of control relative to visuals having a single data stream. Note that similar granularity of control can be accomplished by having (e.g., three) separate child visuals under a single parent visual, however this requires that the program code work with multiple visuals, which is more complicated than working with a single layered visual having indexes to multiple layers.

By way of example, in FIG. 11, background data, content data and border data are contained in a single layered visual, but are separated from one another as indexed by a layer value, e.g., 0, 1 or 2, respectively. Layers can be inserted, including tacked onto either end, and/or deleted, with the layering order (e.g., left-to-right as shown) defining an implied Z-order for display. Note that for security, child content and other data in a layered visual cannot be enumerated.

Other types of visuals include container visuals, and redirected child HWnd visuals, in which content is drawn to a bitmap, and incorporated into a surface visual. Three-dimensional visuals enable a connection between two-dimensional and three dimensional worlds, e.g., a camera-like view is possible via a two-dimensional visual having a view into a three-dimensional world.

Many of the resource objects are immutable once created, that is, once they are created they cannot be changed for various reasons, including simplifying threading issues, preventing corruption by others, and simplifying the interaction with elements and APIs. Note that this generally simplifies the system. It should be noted, however, that it is feasible to have a system where such objects are mutable, but for example would require managing a dependency graph. For example, while it is possible to have a system where such objects are mutable, if program code changed the clip set on a Visual, the visual would need to be re-rendered, thus requiring a notification/registration mechanism, e.g., if a new clip is assigned to a visual, the visual registers itself with the clip for notifications (e.g., a clip changed notification). Thus, in one implementation, for simplification purposes, resource objects are immutable.

These resource objects can be defined with a constructor, which is a straightforward, generic way to create an object, or by using a companion builder object, as described below. For instance, to create a SolidColorBrush, (brush objects are described below), a constructor may be used:

```
Brush MyBrush=new SolidColorBrush(Colors.Red);
```

The user can also use the static members on the Brushes class to get a set of predefined colors.

Because immutable objects cannot be changed, to effectively change an object, the user needs to create a new object and replace the old one with it. To this end, many of the resource objects in the system may utilize the builder pattern, in which immutable objects are created with a builder class, which is a companion class that is mutable. The user creates an immutable object to mirror the parameters set on the builder, creates a new builder for that object, and initializes it from the immutable object. The user then changes the builder as necessary. Once done, the user can build a new object, by changing the builder and reusing it to create another immutable object. Note that having immutable objects with set properties is desirable, and that immutable objects cannot be changed, but only replaced by firing a property change event.

Thus, instead of using a constructor to create a SolidColorBrush as described above, a SolidColorBrushBuilder may be used:

```
SolidColorBrushBuilder MyBuilder = new SolidColorBrushBuilder( );
MyBuilder.Color = Colors.Red;
Brush MyBrush = MyBuilder.ToBrush( );
```

Most objects that take static values can also take animation objects. For instance, on the DrawingContext there is an override on DrawCircle that takes a PointAnimationBase for the center of the circle. In this way, the user can specify rich animation information at the primitive level. For resource objects there exists an animation collection in addition to the base value. These are composited, whereby if the user wanted to animate the above example, the user could specify the following example line before the brush is built:

```
MyBuilder.ColorAnimations.Add(new ColorAnimation( . . . ));
```

Note that an object with animation parameters is still immutable, because its animation parameters are static. However, when the scene graph is processed (e.g., traversed), the meaning of animation parameters changes over time, giving the appearance of animated, not static, data.

As described above, visuals can be drawn on by populating their drawing contexts with various drawing primitives, including Geometry, ImageData and VideoData. Furthermore, there are a set of resources and classes that are shared through this entire stack. This includes Pens, Brushes, Geometry, Transforms and Effects. The IDrawingContext exposes a set of drawing operations that can be used to populate a DrawingVisual, ValidationVisual. ISurfaceDrawingContext, a base interface to IDrawing context, can be used to populate a SurfaceVisual. In other words, the drawing context exposes a set of drawing operations; for each drawing operation there are two methods, one that takes constants as arguments, and one that takes animators as arguments.

The DrawLine method draws a line with the specified pen from the start point to the end point.

```
public void DrawLine(Pen pen, Point start, Point end);
public void DrawLine(
    Pen pen,
    PointAnimationBase start,
    PointAnimationBase end);
```

The DrawRoundedRectangle method draws a rounded rectangle with the specified brush and pen; brush and pen can be null.

```
public void DrawRoundedRectangle(
    Brush brush,
    Pen pen,
    Point topLeft,
    Size size,
    float radius);
public void DrawRoundedRectangle(
    Brush brush,
    Pen pen,
    PointAnimationBase topLeft,
    SizeAnimationBase size,
    NumberAnimationBase radius);
public void DrawRoundedRectangle(
    Brush brush,
    Pen pen,
    Point topLeft,
    Point bottomRight,
    float rx,
    float ry);
public void DrawRoundedRectangle(
    Brush brush,
    Pen pen,
    PointAnimationBase topLeft,
    PointAnimationBase bottomRight,
    NumberAnimationBase radiusX,
    NumberAnimationBase radiusY);
```

The DrawGeometry method draws a path with the specified brush and pen; brush and pen can be null.

```
public void DrawGeometry(
    Brush brush,
    Pen pen,
    Geometry geometry);
```

The DrawRectangle method draws a rectangle with the specified brush and pen; brush and pen can be null.

```
public void DrawRectangle(
    Brush brush,
    Pen pen,
    Point topLeft,
    Size size);
public void DrawRectangle(
    Brush brush,
    Pen pen,
    PointAnimationBase topLeft,
    SizeAnimationBase size);
```

The DrawSurface method draws a surface.

```
public void DrawSurface(
    Surface surface,
    Point topLeft,
    Size size,
    float opacity);
public void DrawSurface(
    Surface image,
    PointAnimationBase topLeft,
    SizeAnimationBase size,
    NumberAnimationBase opacity);
```

Geometry is a type of class (FIG. 12) that defines a vector graphics skeleton, without stroke or fill. Each geometry object is a simple shape (LineGeometry, EllipseGeometry, RectangleGeometry), a complex single shape (PathGeometry) or a list of such shapes GeometryList with a combine operation (e.g., union, intersection, and so forth) specified. These objects form a class hierarchy as represented in FIG. 12.

Figure 13:
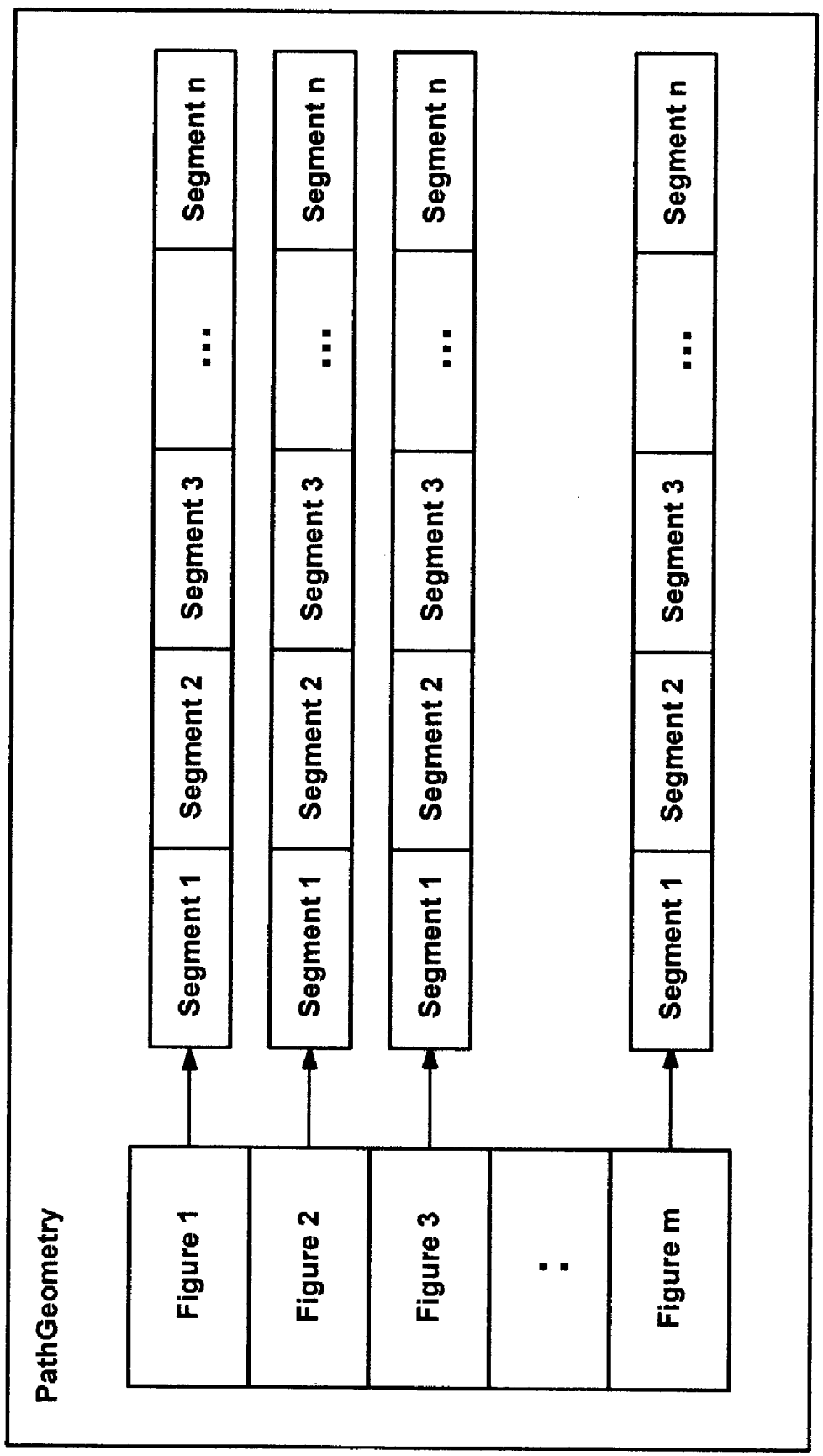
FIG. 13 is a representation of a PathGeometry structure, in accordance with an aspect of the present invention.

As represented in FIG. 13, the PathGeometry is a collection of Figure objects. In turn, each of the Figure objects is composed of one or more Segment objects which actually define the figure's shape. A Figure is a sub-section of a Geometry that defines a segment collection. This segment collection is a single connected series of two-dimensional Segment objects. The Figure can be either a closed shape with a defined area, or just a connected series of Segments that define a curve, but no enclosed area.

The filled area of the PathGeometry is defined by taking the contained Figures that have their Filled property set to true, and applying a FillMode to determine the enclosed area. Note that the FillMode enumeration specifies how the intersecting areas of Figure objects contained in a Geometry are combined to form the resulting area of the Geometry. An "Alternate" rule determines whether a point is inside the canvas, by conceptually drawing a ray from that point to infinity in any direction, and then examining the places where a segment of the shape crosses the ray. By starting with a count of zero and adding one each time a Segment crosses the ray from left to right and subtracting one each time a path segment crosses the ray from right to left, after counting the crossings, if the result is zero then the point is outside the path. Otherwise, it is inside. A "winding" rule determines whether a point on the canvas is inside, and works by conceptually drawing a ray from that point to infinity in any direction and counting the number of path Segments from the given shape that the ray crosses. If this number is odd, the point is inside; if even, the point is outside.

Figure 14:
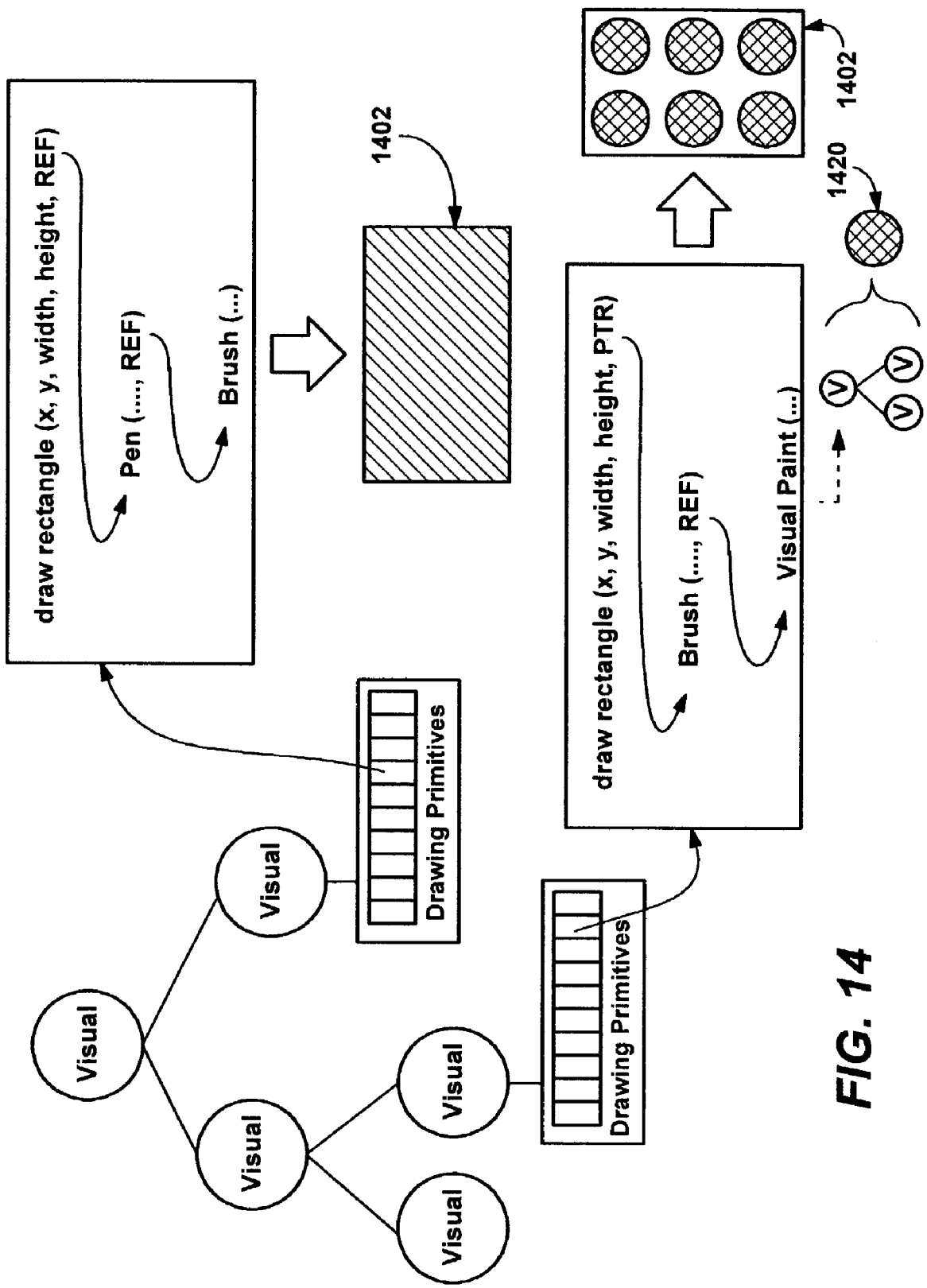
FIG. 14 is a representation of a scene graph of visuals and drawing primitives showing example graphics produced by the primitives, in accordance with an aspect of the present invention.

As represented in FIG. 14, when geometry (e.g., a rectangle) is drawn, a brush or pen can be specified, as described below. Furthermore, the pen object also has a brush object. A brush object defines how to graphically fill a plane, and there is a class hierarchy of brush objects. This is represented in FIG. 14 by the filled rectangle 1402 that results when the visual including the rectangle and brush instructions and parameters is processed.

As described below, some types of Brushes (such as gradients and nine grids) size themselves. When used, the size for these brushes is obtained from the bounding box, e.g., when the GradientUnits/DestinationUnits for the Brush is set to ObjectBoundingBox, the bounding box of the primitive that is being drawn is used. If those properties are set to UserSpaceOnUse, then the coordinate space is used.

A Pen object holds onto a Brush along with properties for Width, LineJoin, LineCap, MiterLimit, DashArray and DashOffset, as represented in the example below:

```
public enum System.Windows.Media.PenLineCap
{
    Butt, Round, Square
}
public enum System.Windows.Media.PenLineJoin
{
    Miter, Round, Bevel
}
public class System.Windows.Media.Pen
{
    // Constructors
    public Pen(Color color, float width);
    public Pen(Brush brush, float width);
    // Properties
    public float[ ] DashArray { get; }
    public float DashOffset { get; }
    public FloatAnimationCollection DashOffsetAnimations { get; }
    public PenLineCap LineCap { get; }
    public PenLineJoin LineJoin { get; }
    public float MiterLimit { get; }
    public FloatAnimationCollection MiterLimitAnimations { get; }
    public float Opacity { get; }
    public FloatAnimationCollection OpacityAnimations { get; }
    public Brush Brush { get; }
    public float Width { get; }
    public FloatAnimationCollection WidthAnimations { get; }
}
public sealed class System.Windows.Media.PenBuilder : Builder
{
    // Fields
    // Constructors
    public PenBuilder( );
    public PenBuilder(Color color);
    public PenBuilder(Brush brush);
    public PenBuilder(Pen pen);
    // Properties
    public float [ ] DashArray { get; set; }
    public float DashOffset { get; set; }
    public FloatAnimationCollectionBuilder DashOffsetAnimations {
        get; }
    public PenLineCap LineCap { get; set; }
    public PenLineJoin Line Join { get; set; }
    public float MiterLimit { get; set; }
    public FloatAnimationCollectionBuilder MiterLimitAnimations {
        get; }
    public float Opacity { get; set; }
    public FloatAnimationCollectionBuilder OpacityAnimations { get;
        }
    public Brush Brush { get; set; }
    public float Width { get; set; }
    public FloatAnimationCollectionBuilder WidthAnimations { get; }
    // Methods
    public Pen ToPen( );
}
```

Figure 15:
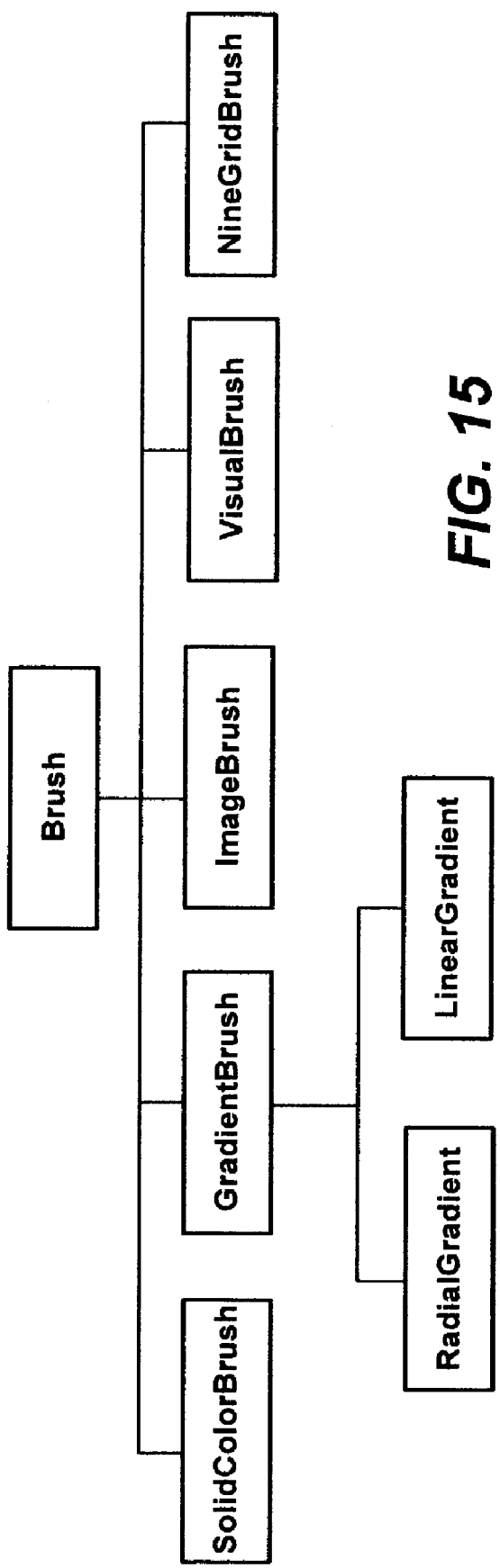
FIG. 15 is a representation of brush classes of the object model, in accordance with an aspect of the present invention.

As mentioned above, the graphics object model of the present invention includes a Brush object model, which is generally directed towards the concept of covering a plane with pixels. Examples of types of brushes are represented in the hierarchy of FIG. 15, and, under a Brush base class, include SolidColorBrush, GradientBrush, ImageBrush, VisualBrush (which can reference a Visual) and NineGridBrush. GradientBrush includes LinearGradient and RadialGradient objects. As described above, Brush objects are immutable.

```
public abstract class System.Windows.Media.Brush
{
    float Opacity { get; }
    FloatAnimationCollection OpacityAnimations { get; }
}
```

The following sets forth an example BrushBuilder class:

```
public abstract class System.Windows.Media.BrushBuilder : Builder
{
    public virtual Brush ToBrush( );
    public override sealed object CreateInstance( );
    {
        return ToBrush( );
    }
    float Opacity { get; set; }
    FloatAnimationCollectionBuilder OpacityAnimations { get; }
}
```

Note that Brush objects may recognize how they relate to the coordinate system when they are used, and/or how they relate to the bounding box of the shape on which they are used. In general, information such as size may be inferred from the object on which the brush is drawn. More particularly, many of the brush types use a coordinate system for specifying some of their parameters. This coordinate system can either be defined as relative to the simple bounding box of the shape to which the brush is applied, or it can be relative to the coordinate space that is active at the time that the brush is used. These are known, respectively, as ObjectBoundingBox mode and UserSpaceOnUse mode.

```
public enum System.Windows.Media.BrushMappingMode
{
    ObjectBoundingBox,
    UserSpaceOnUse,
}
```

A SolidColorBrush object fills the identified plane with a solid color. If there is an alpha component of the color, it is combined in a multiplicative way with the corresponding opacity attribute in the Brush base class. The following sets forth an example SolidColorBrush object:

```
public sealed class System.Windows.Media.SolidColorBrush :
Brush
{
    // Constructors
    public SolidColorBrush( ); // initialize to black
    public SolidColorBrush(Color color);
    public SolidColorBrush
        (System.Windows.Media.Animation.ColorComposer
            colorComposer);
    // Properties
    public Color Color { get; }
    public IEnumerator ColorAnimations { get; }
}
public class System.Windows.Media.SolidColorBrushBuilder :
BrushBuilder
{
    // Constructors
    public SolidColorBrushBuilder( );
    public SolidColorBrushBuilder(Color color);
    public SolidColorBrushBuilder(SolidColorBrush scp);
    // Properties
    public Color Color { get; set; }
    public AnimationList ColorAnimations { get; }
    // Methods
    public virtual Brush ToBrush( );
}
```

The GradientBrush objects, or simply gradients, provide a gradient fill, and are drawn by specifying a set of gradient stops, which specify the colors along some sort of progression. The gradient is by drawn by performing linear interpolations between the gradient stops in a gamma 2.2 RGB color space; interpolation through other gammas or other color spaces (HSB, CMYK and so forth, is also a feasible alternative. Two types of gradient objects include linear and radial gradients.

In general, gradients are composed of a list of gradient stops. Each of these gradient stops contains a color (with the included alpha value) and an offset. If there are no gradient stops specified, the brush is drawn as a solid transparent black, as if there were no brush specified at all. If there is only one gradient stop specified, the brush is drawn as a solid color with the one color specified. Like other resource classes, the gradient stop class (example in the table below) is immutable.

```
public class System.Windows.Media.GradientStop
{
    public GradientStop(Color color, float offset);
    public Color Color { get; }
    public AnimationEnumerator ColorAnimations { get; }
    public float Offset { get; }
    public AnimationEnumerator OffsetAnimations { get; }
}
public class System.Windows.Media.GradientStopBuilder : Builder
{
    public GradientStopBuilder( );
    public GradientStopBuilder(Color color, float offset);
    public Color Color { get; set; }
    public AnimationList ColorAnimations { get; }
    public float Offset { get; set; }
    public AnimationList OffsetAnimations { get; }
    public GradientStop ToGradientStop( );
}
```

There is also a collection class, as set forth in the following example:

```
public class System.Windows.Media.GradientStopCollection :
ICollection
{
    public GradientStopCollection( ); // empty list
    public GradientStopCollection(GradientStop[ ] GradientStops);
    public GradientStopCollection(ICollection c);
    // IEnumerable
    public IEnumerator GetEnumerator( );
    // ICollection
```

-continued

```
    public void CopyTo(Array array, int index);
    public bool ICollection.IsSynchronized { get { return
false; } }
    public int Count { get; }
    public object ICollection.SyncRoot { get; }
    // Extra functions
    public GradientStop this[int index] { get; }
    public bool Contains(GradientStop value);
    public int IndexOf(GradientStop value); // returns
first one
    public int IndexOf(GradientStop value, int startIndex);
    public int IndexOf(GradientStop value, int startIndex,
int count);
    public int LastIndexOf(GradientStop value);
    public int LastIndexOf(GradientStop value, int startIndex);
    public int LastIndexOf(GradientStop value, int startIndex,
int count);
    public GradientStopCollection GetRange(int index, int count);
}
public class System.Windows.Media.GradientStopCollectionBuilder :
Builder,
        IList
{
    public GradientStopCollectionBuilder( );
    public GradientStopCollectionBuilder(GradientStop[ ]
GradientStops);
    public GradientStopCollectionBuilder(ICollection c);
    public GradientStopCollectionBuilder(GradientStopCollection
        GradientStops);
    // IEnnumerable
    public IEnumerator GetEnumerator( );
    // ICollection
    public void CopyTo(Array array, int index);
    public bool ICollection.IsSynchronized { get { return
false; } }
    public int Count { get; }
    public object ICollection.SyncRoot { get; }
    // IList
    public bool IsFixedSize { get { return false; } }
    public bool IsReadOnly { get { return false; } }
    public object IList.this [int index] { get; set; }
    public int IList.Add(object value);
    public void Clear( );
    public bool IList.Contains(object value);
    public int IList.IndexOf(object value); // returns first one
    public void IList.Insert(int index, object value);
    public void IList.Remove(object value); // removes first one
    public void RemoveAt(int index);
    // Extra functions
    public GradientStop this [int index] { get; set; }
    public int Add(GradientStop value);
    public bool Contains(GradientStop value);
    public int IndexOf(GradientStop value); // returns first one
    public int IndexOf(GradientStop value, int startIndex);
    public int IndexOf(GradientStop value, int startIndex, int
count);
    public int LastIndexOf(GradientStop value);
    public int LastIndexOf(GradientStop value, int startIndex);
    public int LastIndexOf(GradientStop value, int startIndex,
int count);
    public void Insert(int index, GradientStop value);
    public void Remove(GradientStop value); // removes first one
    public void AddRange(ICollection c);
    public void InsertRange(int index, ICollection c);
    public void RemoveRange(int index, int count);
    public void SetRange(int index, ICollection c);
    public GradientStopCollectionBuilder GetRange(int index,
int count);
    // Capacity is a hint.   It will throw an exception if it is
set less
        than Count.
    public int Capacity { get; set; }
    // Builder overloads
    public override object Build( );
    public override void ResetBuilder( );
    public override void SetBuilder(Object example);
    public GradientStopCollection ToGradientStopCollection( );
}
```

As represented in the table below, the GradientSpread-Method specifies how the gradient should be drawn outside of the specified vector or space. There are three values, including pad, in which the edge colors (first and last) are used to fill the remaining space, reflect, in which the stops are replayed in reverse order repeatedly to fill the space, and repeat, in which the stops are repeated in order until the space is filled:

```
public enum System.Windows.Media.GradientSpreadMethod
{
    Pad,
    Reflect,
    Repeat
}
```

Figure 16:
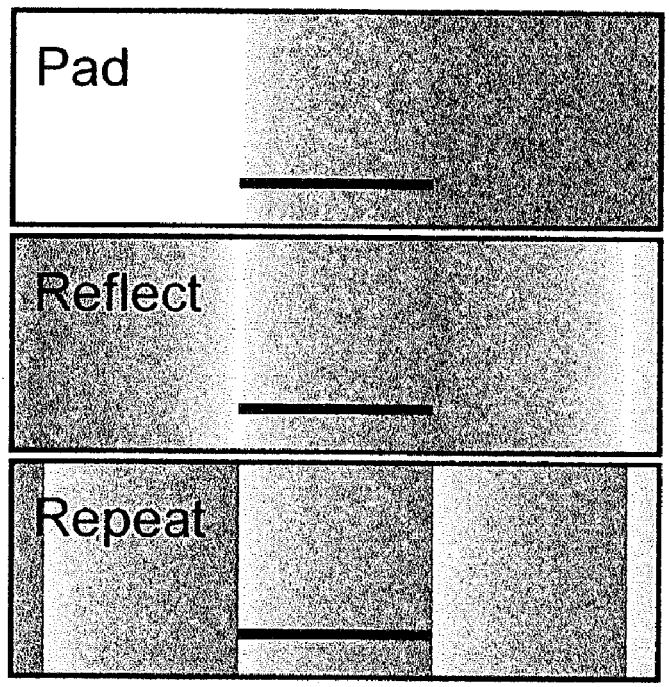
FIG. 16 is a representation of rendered graphics resulting from data in a linear gradient brush object, in accordance with an aspect of the present invention.

FIG. 16 shows examples of the GradientSpreadMethod. Each shape has a linear gradient going from white to grey. The solid line represents the gradient vector.

The LinearGradient specifies a linear gradient brush along a vector. The individual stops specify colors stops along that vector. An example is shown in the table below:

```
public class System.Windows.Media.LinearGradient : GradientBrush
{
    // Sets up a gradient with two colors and a gradient vector
    // specified to fill the object the gradient is applied to.
    // This implies ObjectBoundingBox for the GradientUnits
    // property
    public LinearGradient(Color color1, Color color2, float
        angle);
    public BrushMappingMode GradientUnits { get; }
    public Transform GradientTransform { get; }
    public Gradient SpreadMethod SpreadMethod { get; }
    // Gradient Vector
    public Point VectorStart { get; }
    public PointAnimationCollection VectorStartAnimations { get; }
    public Point VectorEnd { get; }
    public PointAnimationCollection VectorEndAnimations { get; }
    // Gradient Stops
    public GradientStopCollection GradientStops { get; }
}
public class System.Window.Media.LinearGradientBuilder :
        GradientBrushBuilder
{
    public LinearGradientBuilder( );
    public LinearGradientBuilder(Color color1, Color color2, float
        angle);
    public LinearGradientBuilder(LinearGradient lg);
    // GradientUnits: Default is ObjectBoundingBox
    public BrushMappingMode GradientUnits { get; set; }
    // GradientTransform: Default is identity
    public Transform GradientTransform { get; set; }
    // SpreadMethod: Default is Pad
    public GradientSpreadMethod SpreadMethod { get; set; }
    // Gradient Vector
    // Default vector is (0,0) - (1,0)
    public Point VectorStart { get; set; }
    public PointAnimationCollectionBuilder VectorStartAnimations {
        get; set; }
    public Point VectorEnd { get; set; }
    public PointAnimationCollectionBuilder VectorEndAnimations {
        get; set;
            }
    // Gradient Stops
    public void AddStop(Color color, float offset};
    public GradientStopCollectionBuilder GradientStops { get;
set; }
}
```

The RadialGradient is similar in programming model to the linear gradient. However, whereas the linear gradient has a start and end point to define the gradient vector, the radial gradient has a circle along with a focal point to define the gradient behavior. The circle defines the end point of the gradient, that is, a gradient stop at 1.0 defines the color at the circle. The focal point defines center of the gradient. A gradient stop at 0.0 defines the color at the focal point.

Figure 17:
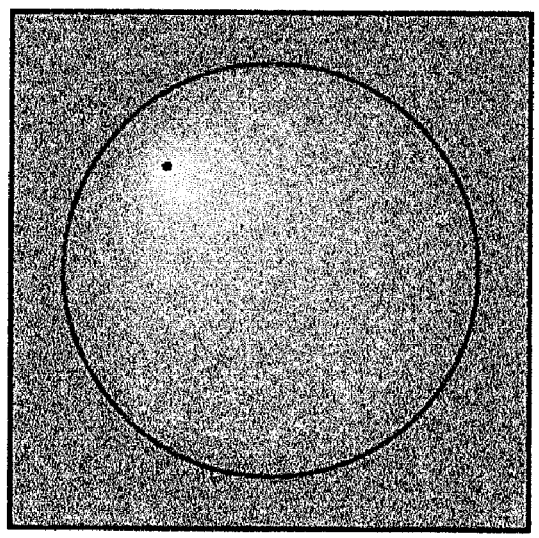
FIG. 17 is a representation of rendered graphics resulting from data in a radial gradient brush object, in accordance with an aspect of the present invention.

FIG. 17 shows a radial gradient that from white to grey. The outside circle represents the gradient circle while the dot denotes the focal point. This example gradient has its SpreadMethod set to Pad:

```
public class System.Windows.Media.RadialGradient : GradientBrush
{
    // Sets up a gradient with two colors.
    // This implies ObjectBoundingBox for the GradientUnits
    // property along with a center at (0.5,0.5)
    // a radius of 0.5 and a focal point at (0.5,0.5)
    public RadialGradient(Color color1, Color color2);
    public BrushMappingMode GradientUnits { get; }
    public Transform GradientTransform { get; }
    public GradientSpreadMethod SpreadMethod { get; }
    // Gradient definition
    public Point CircleCenter { get; }
    public PointAnimationCollection CircleCenterAnimations { get; }
    public float CircleRadius { get; }
    public FloatAnimationCollection CircleRadiusAnimations { get; }
    public Point Focus { get; }
    public PointAnimationCollection FocusAnimations { get; }
    // Gradient Stops
    public GradientStopCollection GradientStops { get; }
}
public class System.Windows.Media.RadialGradientBuilder :
        GradientBrushBuilder
{
    public RadialGradientBuilder( );
    public RadialGradient(Color color1, Color color2);
    public RadialGradientBuilder(RadialGradient rg);
    // GradientUnits: Default is ObjectBoundingBox
    public BrushMappingMode GradientUnits { get; set; }
    // GradientTransform: Default is identity
    public Transform GradientTransform { get; set; }
    // SpreadMethod: Default is Pad
    public GradientSpreadMethod SpreadMethod { get; set; }
    // Gradient definition
    public Point CircleCenter { get; set; } //Default: (0.5, 0.5)
    public PointAnimationCollectionBuilder CircleCenterAnimations {
        get; set;}
    public float CircleRadius { get;set; } // Default: 0.5
    public FloatAnimationCollectionBuilder CircleRadiusAnimations {
        get;set; }
    public Point Focus { get;set; } // Default: (0.5, 0.5)
    public PointAnimationCollectionBuilder FocusAnimations { get;
        set; }
    // Gradient Stops
    public void AddStop(Color color, float offset);
    public GradientStopCollectionBuilder GradientStops { get; set; }
}
```

Another brush object represented in FIG. 15 is a VisualBrush object. Conceptually, the VisualBrush provides a way to have a visual drawn in a repeated, tiled fashion as a fill. Visual paint objects also provide a mechanism for markup language to directly work with the API layer at a resource level, as described below. An example of such a fill is represented in FIG. 14 by the visual brush referencing a visual (and any child visuals) that specifies a single circular shape 1420, with that circular shape filling a rectangle 1422. Thus, the VisualBrush object may reference a visual to define how that brush is to be drawn, which introduces a type of multiple use for visuals. In this manner, a program may use an arbitrary graphics "metafile" to fill an area via a brush or pen. Since this is a compressed form for storing and using arbitrary graphics, it serves a graphics resource. The following sets forth an example VisualBrush object:

```
public class System.Windows.Media.VisualBrush : Brush
{
    public VisualBrush(Visual v);
    public BrushMappingMode DestinationUnits { get; }
    public BrushMappingMode ContentUnits { get; }
    public Transform Transform { get; }
    public Rect ViewBox { get; }
    public Stretch Stretch { get; }
    public HorizontalAlign HorizontalAlign { get; }
    public VerticalAlign VerticalAlign { get; }
    public Point Origin { get; }
    public PointAnimationCollection OriginAnimations { get; }
    public Size Size { get; }
    public SizeAnimationCollection SizeAnimations { get; }
    // Visual
    public Visual Visual { get; }
}
public class System.Windows.Media.VisualBrushBuilder : BrushBuilder
{
    public VisualBrushBuilder( );
    public VisualBrushBuilder(Visual v);
    public VisualBrushBuilder(VisualBrush vb);
    // DestinationUnits: Default is ObjectBoundingBox
    public BrushMappingMode DestinationUnits { get; set; }
    // ContentUnits: Default is ObjectBoundingBox
    public BrushMappingMode ContentUnits { get; set; }
    // Transform: Default is Identity
    public Transform Transform { get; set; }
    // ViewBox: Default is (0,0,0,0) -- unset and ignored
    public Rect ViewBox { get; set; }
    // Stretch: Default is None -- and ignored
    //              because the ViewBox is not set
    public Stretch Stretch { get; set; }
    // HorizontalAlign: Default is Center and ignored
    public HorizontalAlign HorizontalAlign { get; set; }
    // VerticalAlign: Default is Center and ignored
    public VerticalAlign VerticalAlign { get; set; }
    // Origin: Default is (0,0)
    public Point Origin { get; set; }
    public PointAnimationCollectionBuilder OriginAnimations { get;
        set; }
    // Size: Default is (1,1)
    public Size Size { get; set; }
    public SizeAnimationCollectionBuilder SizeAnimations { get; set; }
    // Visual: Default is null -- nothing drawn
    public Visual Visual { get; set; }
}
```

A VisualBrush's contents have no intrinsic bounds, and effectively describe an infinite plane. These contents exist in their own coordinate space, and the space which is being filled by the VisualBrush is the local coordinate space at the time of application. The content space is mapped into the local space based on the ViewBox, ViewPort, Alignments and Stretch properties. The ViewBox is specified in content space, and this rectangle is mapped into the ViewPort (as specified via the Origin and Size properties) rectangle.

The ViewPort defines the location where the contents will eventually be drawn, creating the base tile for this Brush. If the value of DestinationUnits is UserSpaceOnUse, the Origin and Size properties are considered to be in local space at the time of application. If instead the value of DestinationUnits is ObjectBoundingBox, then an Origin and Size are considered to be in the coordinate space, where 0,0 is the top/left corner of the bounding box of the object being brushed, and 1,1 is the bottom/right corner of the same box. For example, consider a RectangleGeometry being filled which is drawn from 100, 100 to 200,200. In such an example, if the DestinationUnits is UserSpaceOnUse, an Origin of 100,100 and a Size of 100,100 would describe the entire content area. If the DestinationUnits is ObjectBoundingBox, an Origin of 0,0 and a Size of 1,1 would describe the entire content area. If the Size is empty, this Brush renders nothing.

The ViewBox is specified in content space. This rectangle is transformed to fit within the ViewPort as determined by the Alignment properties and the Stretch property. If the Stretch is none, then no scaling is applied to the contents. If the Stretch is Fill, then the ViewBox is scaled independently in both X and Y to be the same size as the ViewPort. If the Stretch is Uniform or UniformToFill, the logic is similar but the X and Y dimensions are scaled uniformly, preserving the aspect ratio of the contents. If the Stretch is Uniform, the ViewBox is scaled to have the more constrained dimension equal to the ViewPort's size. If the Stretch is UniformToFill, the ViewBox is scaled to have the less constrained dimension equal to the ViewPort's size. In other words, both Uniform and UniformToFill preserve aspect ratio, but Uniform ensures that the entire ViewBox is within the ViewPort (potentially leaving portions of the ViewPort uncovered by the ViewBox), and UniformToFill ensures that the entire ViewPort is filled by the ViewBox (potentially causing portions of the ViewBox to be outside the ViewPort). If the ViewBox is empty, then no Stretch will apply. Note that alignment will still occur, and it will position the "point" ViewBox.

Figure 18:
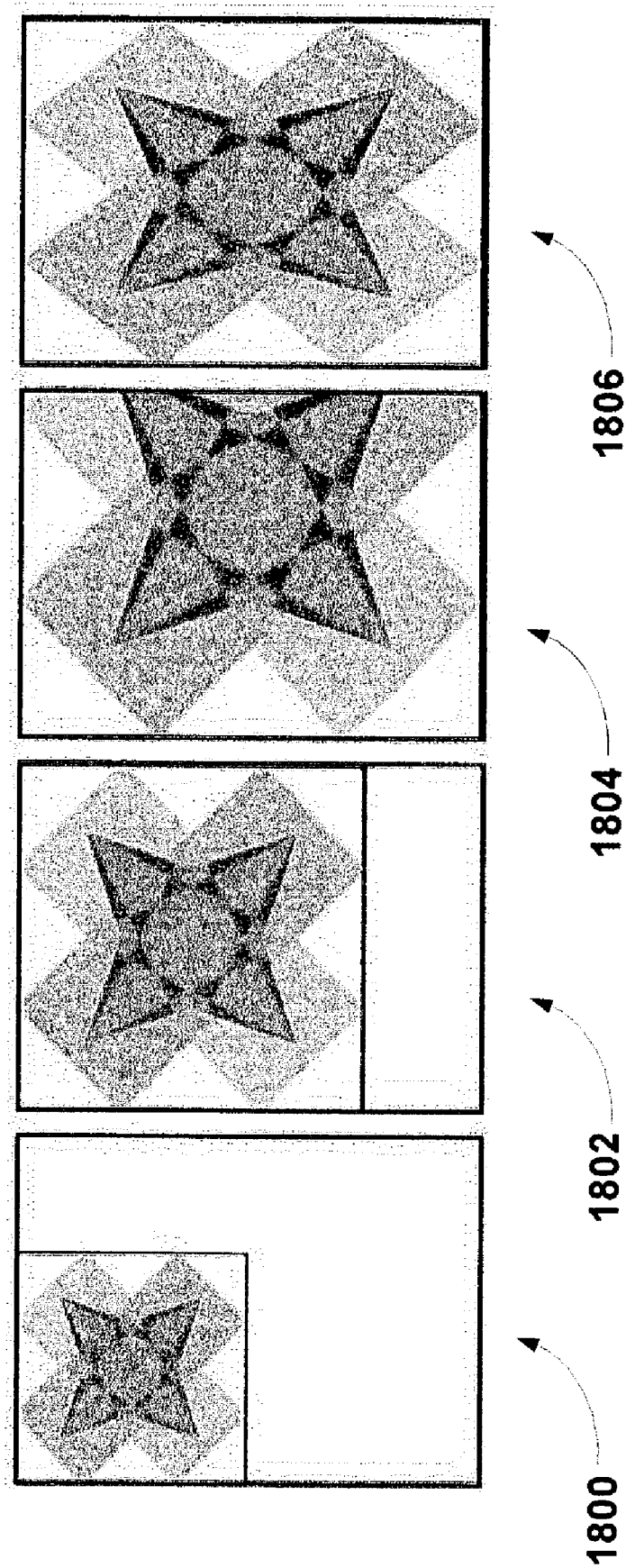
FIG. 18 is a representation of rendered graphics resulting from having various stretch values, in accordance with an aspect of the present invention.

FIG. 18 provides representations of a single tile 1800 of graphics rendered with various stretch settings, including a tile 800 when stretch is set to "none." The tile 1802 is a representation of when the stretch is set to "Uniform," the tile 1804 when stretch is set to "UniformToFill," and the tile 1806 when stretch is set to "Fill."

Once the ViewPort is determined (based on DestinationUnits) and the ViewBox's size is determined (based on Stretch), the ViewBox needs to be positioned within the ViewPort. If the ViewBox is the same size as the ViewPort (if Stretch is Fill, or if it just happens to occur with one of the other three Stretch values), then the ViewBox is positioned at the Origin so as to be identical to the ViewPort. Otherwise, HorizontalAlignment and VerticalAlignment are considered. Based on these properties, the ViewBox is aligned in both X and Y dimensions. If the HorizontalAlignment is Left, then the left edge of the ViewBox will be positioned at the Left edge of the ViewPort. If it is Center, then the center of the ViewBox will be positioned at the center of the ViewPort, and if Right, then the right edges will meet. The process is repeated for the Y dimension.

If the ViewBox is (0,0,0,0), it is considered unset, whereby ContentUnits are considered. If the ContentUnits are UserSpaceOnUse, no scaling or offset occurs, and the contents are drawn into the ViewPort with no transform. If the ContentUnits are ObjectBoundingBox, then the content origin is aligned with the ViewPort Origin, and the contents are scale by the object's bounding box's width and height.

When filling a space with a VisualBrush, the contents are mapped into the ViewPort as above, and clipped to the ViewPort. This forms the base tile for the fill, and the remainder of the space is filled based on the Brush's TileMode. Finally, if set, the Brush's transform is applied—it occurs after all the other mapping, scaling, offsetting, etc.

Figure 19:
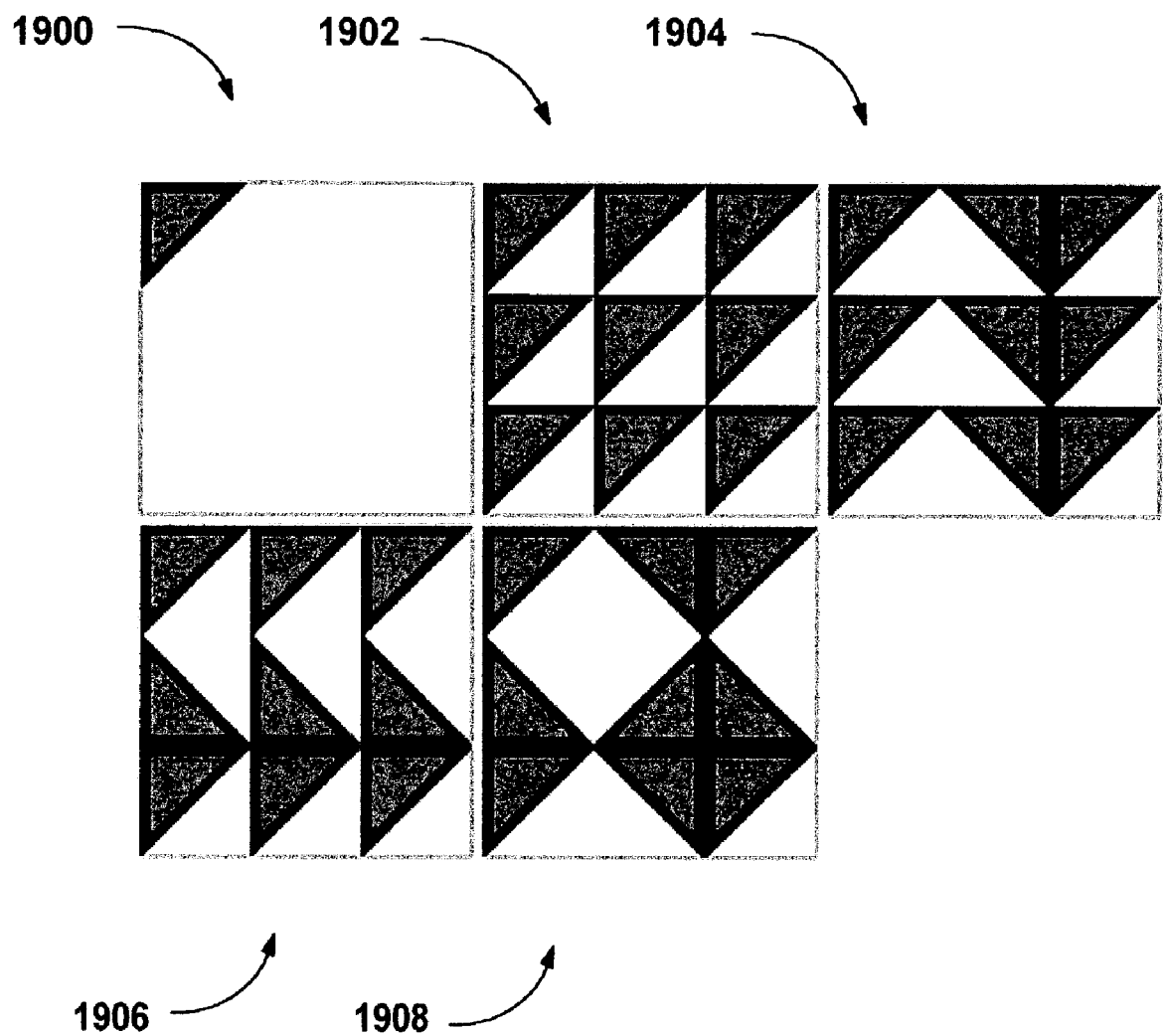
FIG. 19 is a representation of rendered graphics resulting from having various tile values, in accordance with an aspect of the present invention.

The TileMode enumeration is used to describe if and how a space is filled by its Brush. A Brush which can be tiled has a tile rectangle defined, and this tile has a base location within the space being filled. The rest of the space is filled based on the TileMode value. FIG. 19 provides a representation of example graphics with various TileMode settings, including "None" 1900, "Tile" 1092, "FlipX" 1904, "FlipY" 1906 and "FlipXY" 1908. The top left-most tile in the various example graphics comprises the base tile.

Figure 20:
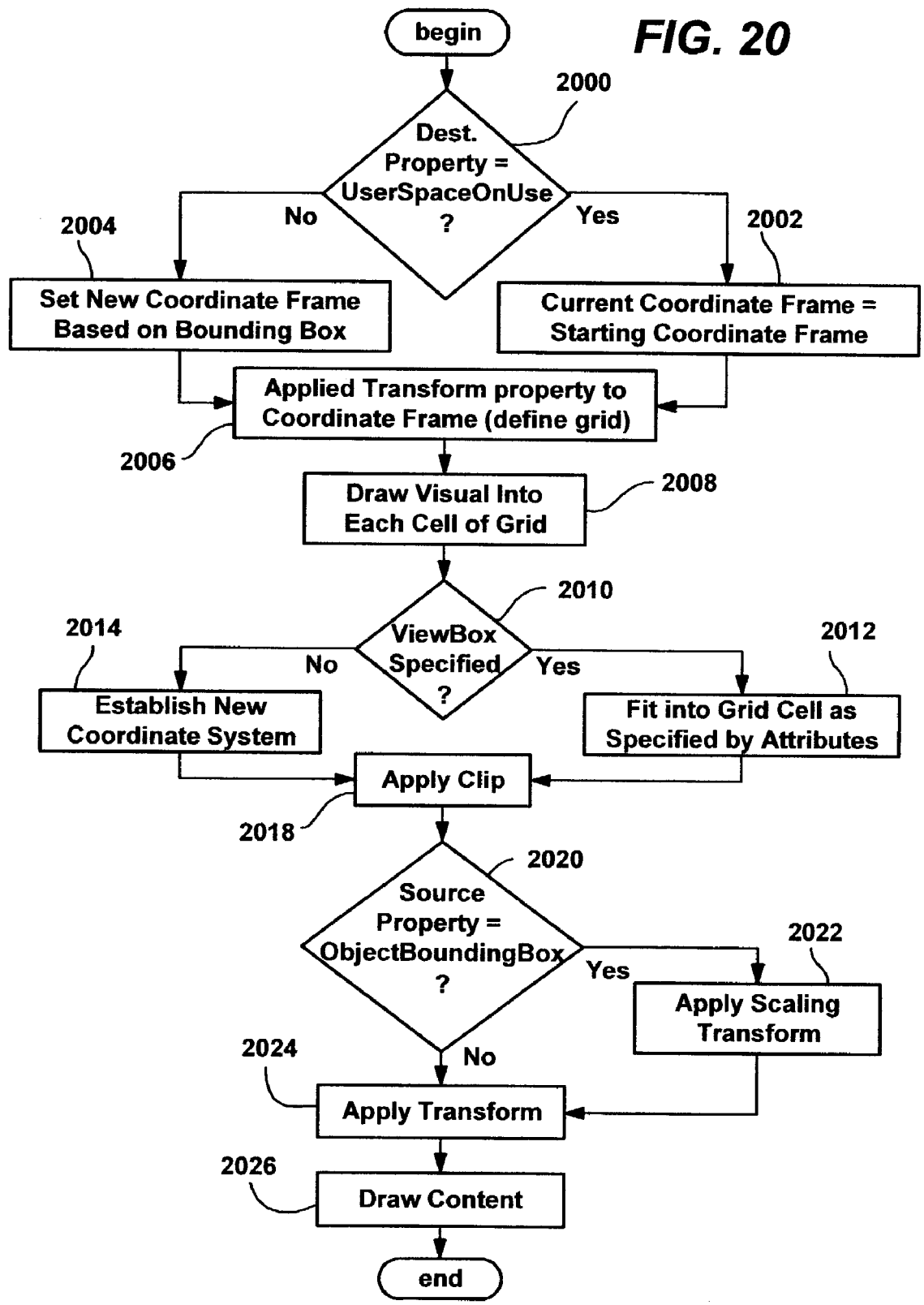
FIG. 20 is a flow diagram generally representing logic for interpreting a visual, including a brush object, to generate graphics in accordance with an aspect of the present invention.

FIG. 20 represents a process for generating the pixels for this brush. Note that the logic described in FIG. 20 is only one possible way to implement of the logic, and it should be understood that other ways, including more efficient ways, are feasible. For example, there are likely more efficient ways processing the data, e.g., such that the content is not drawn for each repetition, with the tile drawn and cached. However, FIG. 20 provides a straightforward description.

In general, each time the contents of the pattern are drawn, a new coordinate system is created. The origin and offset of each repetition is specified by the Origin and Size properties, as filtered through the DestinationUnits and Transform properties.

A coordinate frame is set up based on the DestinationUnits property. To this end, if at step 2000, the DestinationUnits property is UserSpaceOnUse, the current coordinate frame at the time the brush was used is the starting coordinate frame, via step 2002. If instead at step 2004 the property is ObjectBoundingBox, the bounding box of the geometry to which this brush is applied is used, as represented by step 2004, to set a new coordinate frame such that the upper left corner of the bounding box maps to (0,0) and the lower left corner of the bounding box maps to (1,1). In either case, at step 2006 the Transform property is applied to this coordinate frame, which essentially defines a grid.

Figure 21:
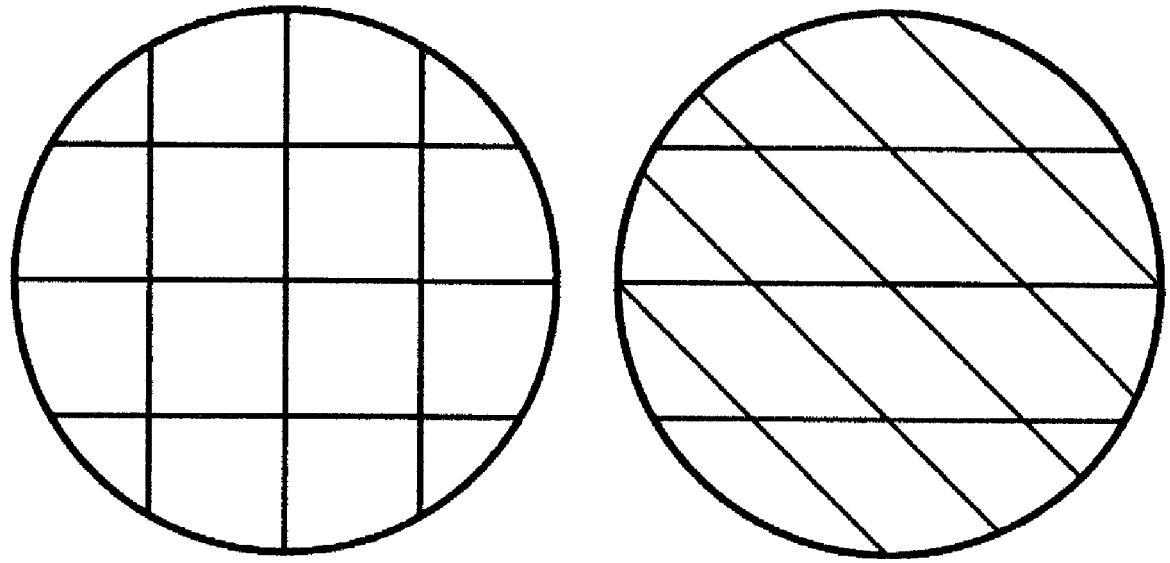
FIG. 21 is a representation of a grid and transformed grid, resulting from data in a visual brush object, in accordance with an aspect of the present invention.

FIG. 21 represents a VisualBrush Grid that is defined for the tiles in a VisualBrush. The first circle is a simple grid, and the second has a Transform with a Skew in the x direction of 47.

Figure 22:
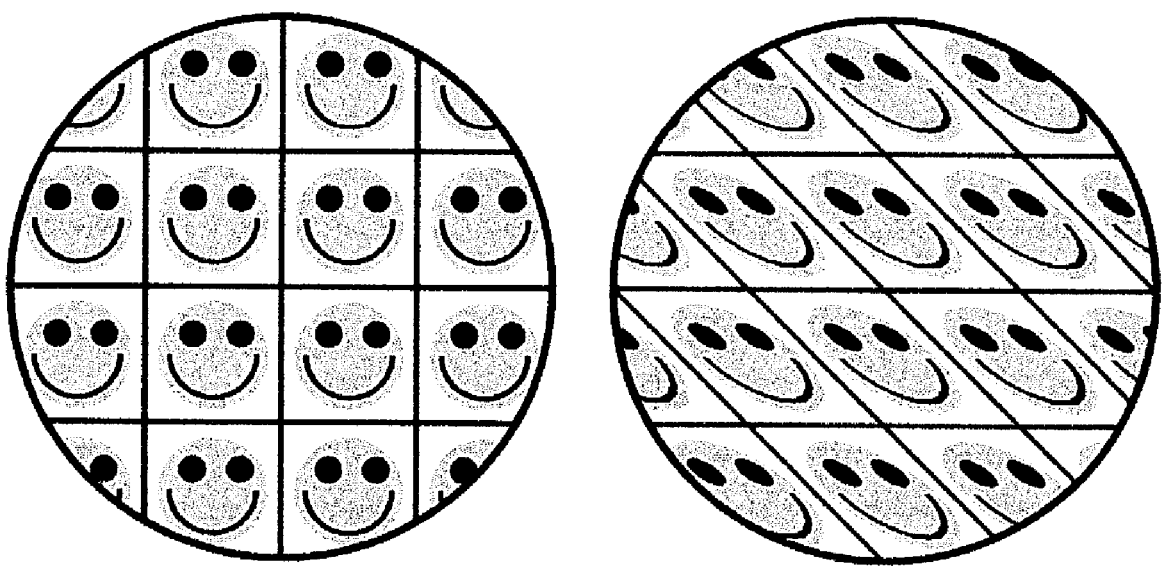
FIG. 22 is a representation of the grid and transformed grid, with rendered graphics therein drawn from a visual, in accordance with an aspect of the present invention.

At step 2008, the visual is drawn into each cell of the grid, as represented in FIG. 22, where the visual draws the appropriate data. If at step 2010 there is a ViewBox specified, the Visual is fitted into the grid cell as specified by the ViewBox, Stretch, HorizontalAlign and VerticalAlign attributes, via step 2012. The DestinationUnits and Transform properties are used to apply the correct transform such that the visual lines up in the grid box.

If there is no ViewBox specified, then a new coordinate system is established for drawing the content at step 2014.

The coordinate frame is set such that its origin is at the Origin point for that particular grid cell being drawn.

A clip is applied at step 2018 based on the Size property such that this tile will not draw outside of the bounds of the cell. The Origin and Size are modified appropriately based on the DestinationUnits property.

The coordinate system is then modified, based on the SourceUnits property. To this end, if at step 2020 the SourceUnits property is ObjectBoundingBox, the appropriate scaling transform is applied at step 2026, otherwise it is UserSpaceOnUse, and no new transform is applied. The Transform property is applied at step 2024, and the content is drawn at step 2026.

Note that if any part of size is zero, nothing is drawn, and if Stretch is "None," the transform for the viewbox is set up such that one unit in the new coordinate frame is equal to one unit in the old coordinate frame. The transform essentially becomes an offset based on the align attributes and the size of the ViewBox. As described above at steps 2010 and 2012, Stretch and the alignment properties only apply when there is a ViewBox specified. The ViewBox specifies a new coordinate system for the contents, and Stretch helps to specify how those contents map into the ViewBox. The alignment options align the ViewBox, not the contents. Thus, for example, if the viewbox is set to "0 0 10 10" and something is drawn at −10,−10 and aligned to the upper left corner, that thing will be clipped out.

Returning to FIG. 15, image brush can be thought of as a special case of VisualBrush. Although a program can create a visual, put an image into it and attach it to VisualBrush, the API for doing so would be cumbersome. Since there is no necessary content coordinate frame, the ViewBox and ContentUnits property members no longer apply.

```
public class System.Windows.Media.ImageBrush : Brush
{
    public ImageBrush(ImageData image);
    public BrushMappingMode DestinationUnits { get; }
    public Transform Transform { get; }
    public Stretch Stretch { get; }
    public HorizontalAlign HorizontalAlign { get; }
    public VerticalAlign VerticalAlign { get; }
    public Point Origin { get; }
    public PointAnimationCollection OriginAnimations { get; }
    public Size Size { get; }
    public SizeAnimationCollection SizeAnimations { get; }
    public ImageData ImageData { get; }
}
public class System.Windows.Media.ImageBrushBuilder : BrushBuilder
{
    public ImageBrushBuilder( );
    public ImageBrushBuilder(ImageData image);
    public ImageBrushBuilder(ImageBrush ib);
    // DestinationUnits: Default is ObjectBoundingBox
    public BrushMappingMode DestinationUnits { get; set; }
    // Transform: Default is identity
    public Transform Transform { get; set; }
    // Stretch: Default is None
    public Stretch Stretch { get; set; }
    // HorizontalAlign: Default is Center
    public HorizontalAlign HorizontalAlign { get; set; }
    // VerticalAlign: Default is Center
    public VerticalAlign VerticalAlign { get; set; }
    // Origin: Default is (0,0)
    public Point Origin { get; set; }
    public PointAnimationCollectionBuilder OriginAnimations { get; set; }
    // Size: Default is (1,1)
    public Size Size { get; set; }
    public SizeAnimationCollectionBuilder SizeAnimations { get; set; }
    // ImageData: Default is null -- nothing drawn
    public ImageData ImageData { get; set; }
}
```

NineGridBrush is very similar to ImageBrush except the image is warped based on the size. In essence, NineGridBrush may be thought of a custom type of Stretch, in which certain parts of the image stretch, while others (e.g., borders) do not. Thus, while the Size of the image in the ImageBrush will cause a simple scale, the NineGridBrush will produce a non-uniform scale up to the desired size. The units for the non-scaled areas are the user units when the brush is applied, which means that ContentUnits (if it existed for NineGridBrush) would be set to UserUnitsOnUse. The Transform property of the Brush can be used effectively. Note that the border members count in from the edge of the image.

Figure 23:
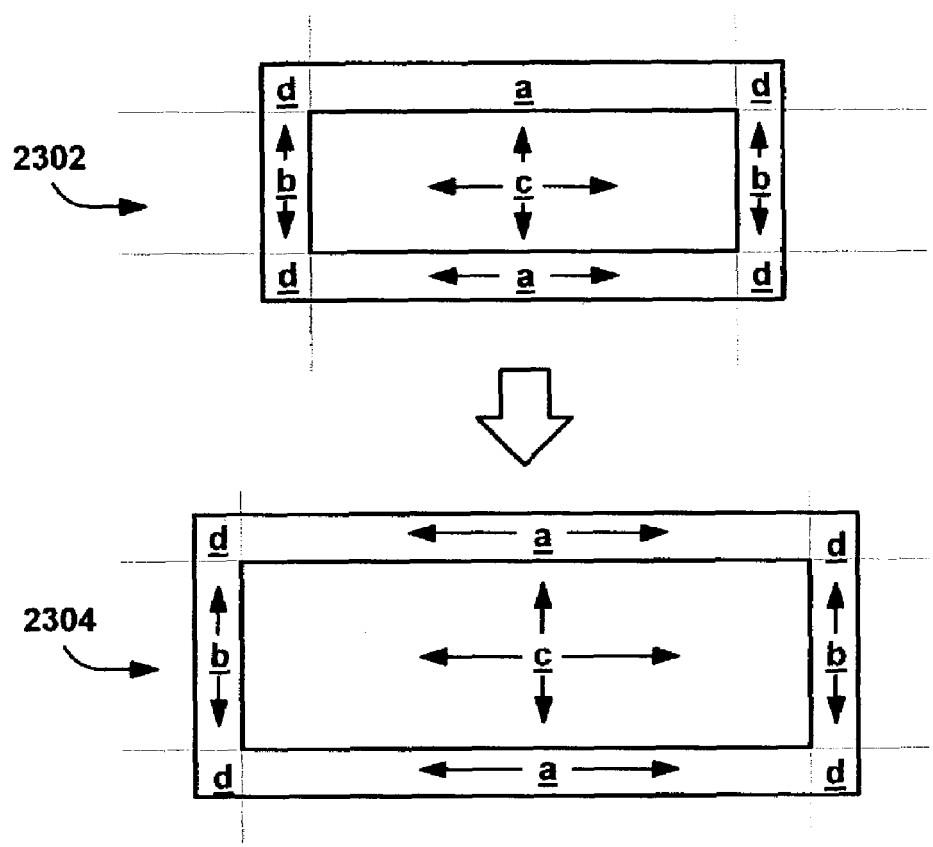
FIG. 23 is a representation of a rendered nine grid brush object in accordance with an aspect of the present invention.

By way of example, FIG. 23 represents a nine-grid image being enlarged from a first instance 2302 to a second instance 2304, with four types of areas. As represented in FIG. 23, to keep the border the same, the areas marked "a" expand horizontally, the areas marked "b" expand vertically, the areas marked "c" expand horizontally and vertically, and the areas marked "d" do not change in size.

```
public class System.Windows.Media.NineGridBrush : Brush
{
    public NineGridBrush(ImageData image,
            int LeftBorder, int RightBorder,
            int TopBorder, int BottomBorder);
    public BrushMappingMode DestinationUnits { get; }
    public Transform Transform { get; }
    public Point Origin { get; }
```

-continued

```
    public PointAnimationCollection OriginAnimations { get; }
    public Size Size { get; }
    public SizeAnimationCollection SizeAnimations { get; }
    public int LeftBorder { get; }
    public int RightBorder { get; }
    public int TopBorder { get; }
    public int BottomBorder { get; }
    public ImageData ImageData { get; }
}
public class System.Window.Media.NineGridBrushBuilder : BrushBuilder
{
    public NineGridBrushBuilder( );
    public NineGridBrushBuilder (ImageData image,
            int LeftBorder, int RightBorder,
            int TopBorder, int BottomBorder);
    public NineGridBrushBuilder (NineGridBrush ngb);
    // DestinationUnits: Default is ObjectBoundingBox
    public BrushMappingMode DestinationUnits { get; set; }
    // Transform: Default is identity
    public Transform Transform { get; set; }
    // Origin: Default is (0,0)
    public Point Origin { get; set; }
    public PointAnimationCollectionBuilder OriginAnimations { get; set; }
    // Size: Default is (1,1)
    public Size Size { get; set; }
    public SizeAnimationCollectionBuilder SizeAnimations { get; set; }
    // *Border: default to 0
    public int LeftBorder { get; set; }
    public int RightBorder { get; set; }
    public int TopBorder { get; set; }
    public int BottomBorder { get; set; }
    // ImageData: Default is null -- nothing drawn
    public ImageData ImageData { get; set; }
}
```

Figure 24:
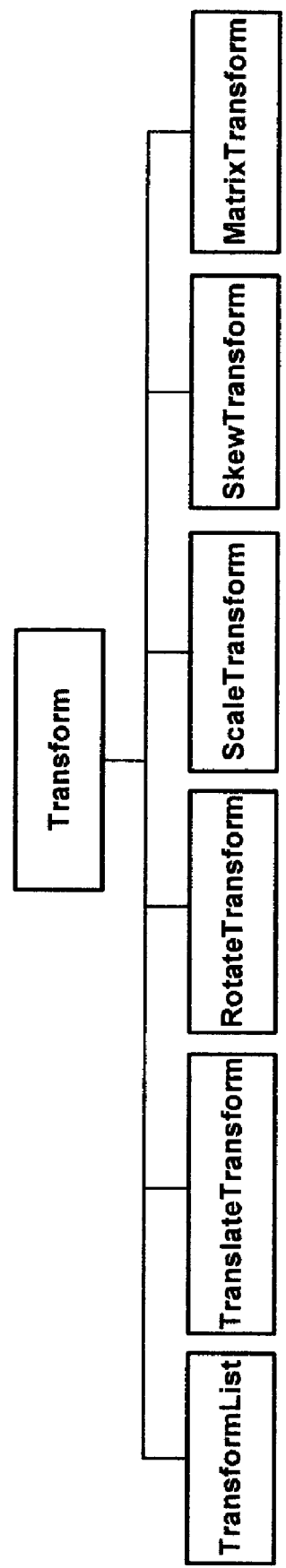
FIG. 24 is a representation of transform classes of the object model, in accordance with an aspect of the present invention.

As generally described above, the graphics object model of the present invention includes a Transform object model, which includes the types of transforms represented in the hierarchy of FIG. 24, under a Transform base class. These different types of components that make up a transform may include TransformList, TranslateTransform, RotateTransform, ScaleTransform, SkewTransform, and MatrixTransform. Individual properties can be animated, e.g., a program developer can animate the Angle property of a RotateTransform.

Matrices for 2D computations are represented as a 3×3 matrix. For the needed transforms, only six values are needed instead of a full 3×3 matrix. These are named and defined as follows.

$$\begin{bmatrix} m00 & m01 & 0 \\ m10 & m11 & 0 \\ m20 & m21 & 1 \end{bmatrix}$$

When a matrix is multiplied with a point, it transforms that point from the new coordinate system to the previous coordinate system:

$$[x_{newCoordSys} \; y_{newCoordSys} \; 1] \cdot \begin{bmatrix} m00 & m01 & 0 \\ m10 & m11 & 0 \\ m20 & m21 & 1 \end{bmatrix} = [x_{oldCoordSys} \; y_{oldCoordSys} \; 1]$$

Transforms can be nested to any level. Whenever a new transform is applied it is the same as post-multiplying it onto the current transform matrix:

$$[X_{newCoordSys}\ y_{newCoordSys}\ 1] \cdot \begin{bmatrix} m00_2 & m01_2 & 0 \\ m10_2 & m11_2 & 0 \\ m20_2 & m21_2 & 1 \end{bmatrix} \cdot$$

$$\begin{bmatrix} m00_1 & m01_1 & 0 \\ m10_1 & m11_1 & 0 \\ m20_1 & m21_1 & 1 \end{bmatrix} = [X_{oldCoordSys}\ y_{oldCoordSys}\ 1]$$

Most places in the API do not take a Matrix directly, but instead use the Transform class, which supports animation.

```
public struct System.Windows.Media.Matrix
{
    // Construction and setting
    public Matrix( ); // defaults to identity
    public Matrix(
                double m00, double m01,
                double m10, double m11,
                double m20, double m21);
    // Identity
    public static readonly Matrix Identity;
    public void SetIdentity( );
    public bool IsIdentity { get; }
    public static Matrix operator *(Matrix matrix1, Matrix
        matrix2);
    public static Point operator *(Matrix matrix, Point point);
    // These function reinitialize the current matrix with
    // the specified transform matrix.
    public void SetTranslation(double dx, double dy);
    public void SetTranslation(Size offset);
    public void SetRotation(double angle); // degrees
    public void SetRotation(double angle, Point center); // degrees
    public void SetRotationRadians(double angle);
    public void SetRotationRadians(double angle, Point center);
    public void SetScaling(double sx, double sy);
    public void SetScaling(double sx, double sy, Point center);
    public void SetSkewX(double angle); // degrees
    public void SetSkewY(double angle); // degrees
    public void SetSkewXRadians(double angle);
    public void SetSkewYRadians(double angle);
    // These function post-multiply the current matrix
    // with the specified transform
    public void ApplyTranslation(double dx, double dy);
    public void ApplyTranslation(Size offApply);
    public void ApplyRotation(double angle); // degrees
    public void ApplyRotation(double angle, Point center); //
        degrees
    public void ApplyRotationRadian(double angle);
    public void ApplyRotationRadian(double angle, Point center);
    public void ApplyScaling(double sx, double sy);
    public void ApplyScaling(double sx, double sy, Point center);
    public void ApplySkewX(double angle); // degrees
    public void ApplySkewY(double angle); // degrees
    public void ApplySkewXRadians(double angle);
    public void ApplySkewYRadians(double angle);
    public void ApplyMatrix(Matrix matrix);
    // Inversion stuff
    public double Determinant { get; }
    public bool IsInvertible { get; }
    public void Invert( ); // Throws ArgumentException if
        !IsInvertable
    public static Matrix Invert(Matrix matrix);
    // Individual members
    public double M00 { get; set; }
    public double M01 { get; set; }
    public double M10 { get; set; }
    public double M11 { get; set; }
    public double M20 { get; set; }
    public double M21 { get; set; }
};
```

Markup Language and Object Model for Vector Graphics

In accordance with an aspect of the present invention, a markup language and element object model are provided to enable user programs and tools to interact with the scene graph data structure 216 without requiring a specific knowledge of the details of the API layer 212 (FIG. 2). In general, a vector graphics markup language is provided, which comprises an interchange format, along with a simple markup based authoring format for expressing vector graphics via the element object model. Via this language, markup (e.g., HTML or XML-type content) may be programmed. Then, to build the scene graph, the markup is parsed and translated into the appropriate visual API layer objects that were as described above. At this higher operating level, an element tree, the property system and the presenter system are provided to handle much of the complexity, making it straightforward for scene designers to design possibly complex scenes.

In general, the vector graphics system generally provides a set of shape and other elements, integration with a general property system, a grouping and compositing system, and a two-tiered (element level and resource level) approach so that the user can program in a way that matches flexibility and performance needs. In keeping with one aspect of the present invention, the element object model for dealing with vector graphics correlates with the scene graph object model. In other words, the vector graphics system and the Visual API layer share a set of resources at the element object model level, e.g., the Brush object is used when drawing at the Visual API and it is also the type of the fill property on Shape. Thus, in addition to having elements that correlate with the scene graph objects, the markup language shares a number of primitive resources (e.g., brushes, transforms, and so forth) with the Visual API layer. The vector graphics system also exposes and extends the animation capabilities of the Visual API layer, which is largely shared between the levels.

Further, as described below, the vector graphics system can program to different profiles, or levels, including an element level and a resource level. In the element level, each of the drawing shapes is represented as an element at the same level as the rest of the programmable elements in a page/screen. This means that the shapes interact in a full way with the presenter system, events and properties. In the resource level, the vector graphics systems operates in a pure resource format, similar to a traditional graphics metafile. The resource level is efficient, but has somewhat limited support for cascaded properties, eventing and fine-grained programmability. The scene designer thus has the ability to balance efficiency with programmability as needed.

In keeping with one aspect of the present invention, the vector graphics system at the resource level also correlates to the visual API layer, in that the resource level markup, in one implementation, is expressed as a VisualBrush. When the resource markup is parsed, a visual object is created. The visual object is set into a VisualBrush which may be used by shapes, controls and other elements at the element level.

Figure 25:
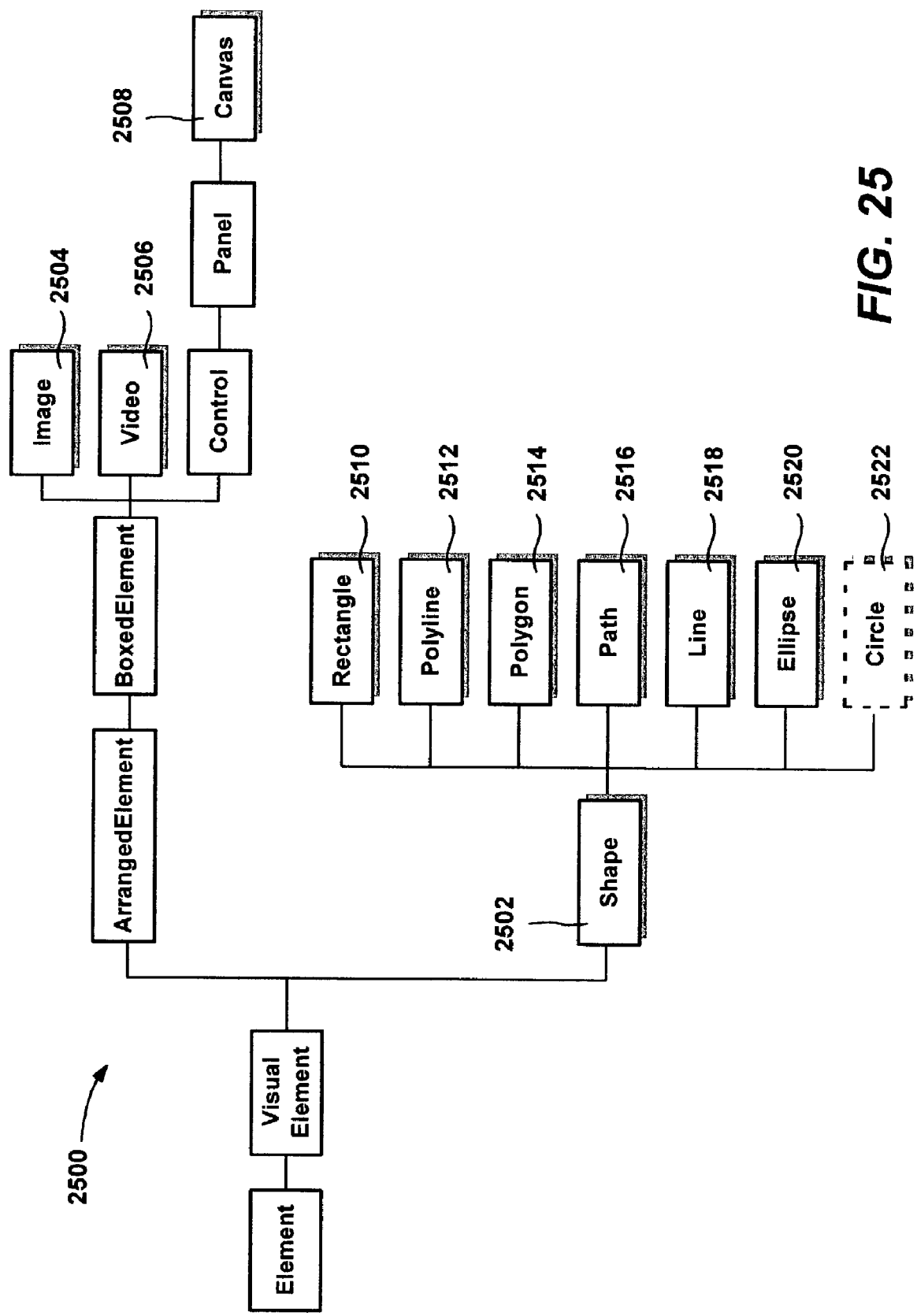
FIG. 25 is a representation of element classes of the element object model, in accordance with an aspect of the present invention.

FIG. 25 is a representation of the element class hierarchy 2500. The classes of the markup language object model of the present invention are represented via shadowed boxes, and include a shape class 2502, an image class 2504, a video class 2506 and a canvas class 2508. Elements of the shape class include rectangle 2510, polyline 2512, polygon 2514, path 2516, line 2518 and ellipse 2520. Note that in some implementations, a circle element may not be present as indicated by the dashed box 2522 in FIG. 25, however for purposes of the various examples herein, the circle element 2522 will be described. Each element may include or be associated with fill (property) data, stroke data, clipping data, transform data, filter effect data and mask data.

As described below, shapes correspond to geometry that is drawn with inherited and cascaded presentation properties. The presentation properties are used to construct the pen and the brush needed to draw the shapes. In one implementation, shapes are full presenters, like other control elements. However, in other implementations, a canvas class 2508 may be provided as a container for shapes, and shapes can only be drawn when in a canvas element. For example, to keep shapes lightweight, shapes may not be allowed to have attached presenters. Instead, the canvas has an attached presenter and draws the shapes. Canvas elements are described in more detail below.

As also described below, the image class is more specific than a shape, and for example can include border data, which may be complex. For example, a border can be specified as one color on the top, a different color on the sides, with possibly various thicknesses specified and other properties set. Position, size rotation and scale may be set for an image or similar boxed element, such as text or video. Note that the image and video elements can exist and be shown outside of a canvas element, and also inherit from BoxedElement, e.g., to get the background, borders and padding support from that element.

The video element allows video (or similar multimedia) to be played within a displayed element. In this manner, the vector graphics system provides a markup interface to the API layer that is seamlessly consistent across multimedia, including text, 2D graphics, 3D graphics, animation, video, still images and audio. This allows designers to that learn to work with one media to easily integrate other media into applications and documents. The vector graphics system also enables multimedia to be animated in the same way as other elements, again allows designers the ability to use multimedia like other elements, yet without sacrificing the core intrinsic uniqueness of each individual media type. For example, a designer can use the same naming scheme for rotating, scaling, animating, drawing, compositing and other effects across different media types, whereby designers may easily create very rich applications, as well as allowing for a very efficient rendering and compositing implementation to be built underneath.

Figure 26:
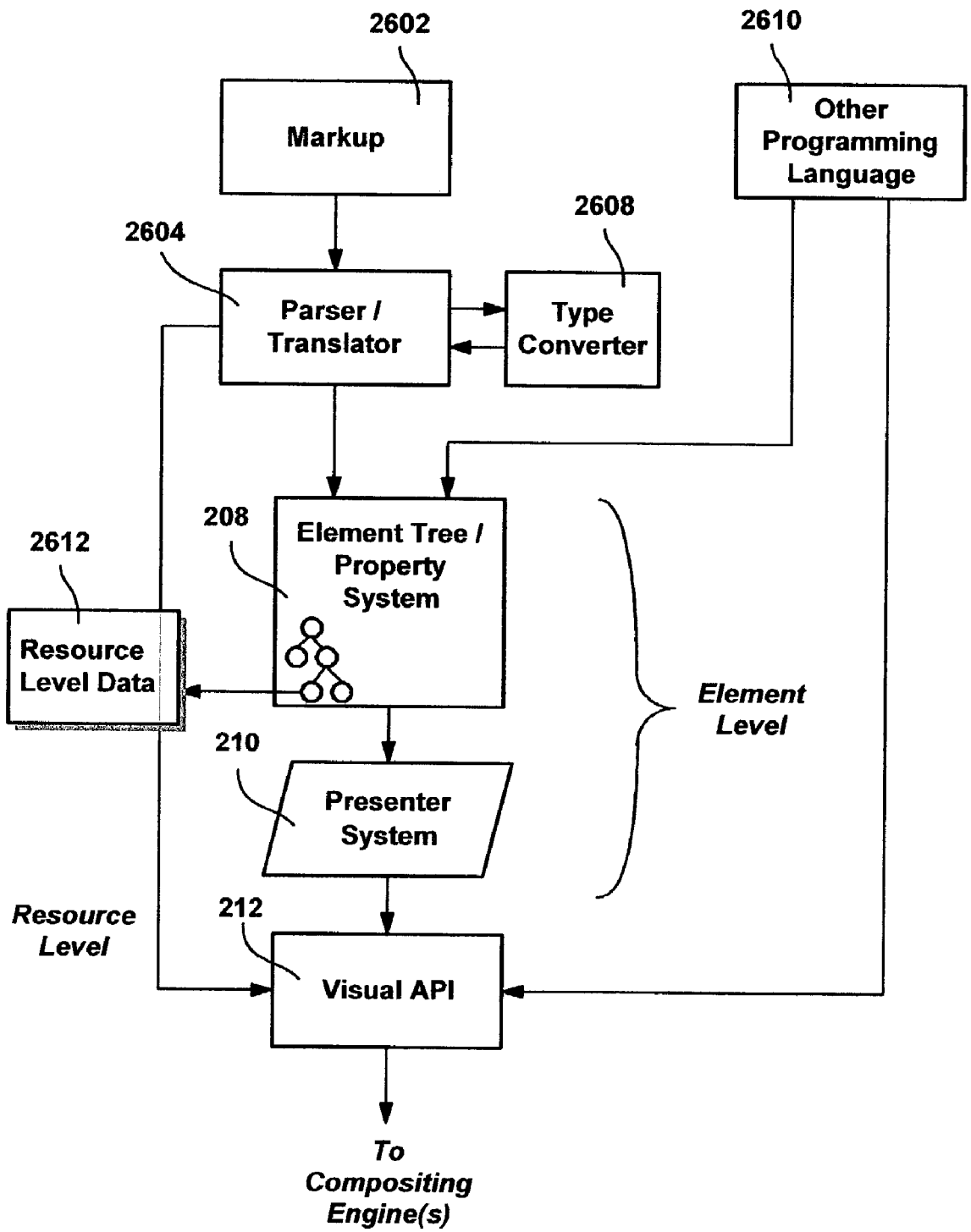
FIG. 26 is a representation of components for interpreting markup language code to interface with the visual API layer, in accordance with an aspect of the present invention.

FIG. 26 represents one implementation in which the markup code 2602 is interpreted by a parser/translator 2604. In general, the parser/translator 2604 adds elements to an element tree/property system 208 (also represented in FIG. 2) and attaches presenters to those elements. The presenter system 210 then takes the element tree 210 with the attached presenters and translates the data to objects and calls to the visual API layer 212. Note that not all elements need to be translated, only those with attached presenters.

In general, an element is an object in the element layer that participates in the property system, eventing and layout/presentation system. The parser finds tags and decides if those tags help to define an element or a resource object. In the special case of a VisualBrush, the same tags may be interpreted as elements or also interpreted as resource objects, depending on the context of where those tags appear, e.g., depending on whether appearing in complex property syntax or not.

In accordance with one aspect of the present invention, the markup language provides distinct ways to describe a resource, including a simple string format or a complex object notation. For a simple string format, the parser/translator 2604 uses a type converter 2608 for converting a string to an appropriate visual API object. By way of example, in the following line of markup, the Fill property value can be converted to a brush object, via the type converter 2608:

```
<Circle CenterX="10" CenterY="10" Radius="5" Fill="Red" />
```

As can be readily appreciated, the conversion of such an inline line of tag-based markup with simple strings of parameters is to a brush object is straightforward, and provides a simple way for a scene designer to add a shape and its attributes to a scene.

However there are times when the fill attribute is too complex to fit into a single string. In such a situation, complex property syntax, which may be inline in the markup, is used to set this property. For example, the following complex property syntax fills a circle with a gradient rather than a solid color, specifying the colors at various gradient stops (which can range from 0 to 1):

```
<Circle CenterX="10" CenterY="10" Radius="5">
    <Circle.Fill>
        <LinearGradient>
            <GradientStop Color="Red" Offset="0"/>
            <GradientStop Color="Blue" Offset="0.33"/>
            <GradientStop Color="Green" Offset="0.66"/>
            <GradientStop Color="Red" Offset="1.0"/>
        </LinearGradient>
    </Circle.Fill>
</Circle>
```

In addition to being present inline in the markup, a resource instance may be located elsewhere (e.g., in the markup or in a file, which can be local or on a remote network and appropriately downloaded), and referenced by a name, (e.g., a text name, reference or other suitable identifier). In this manner, a scene designer can reuse an element in the element tree throughout a scene, including elements described by the complex property syntax.

The parser handles markup in the complex property syntax by accessing the type converter 2608 as necessary, and also matching specified parameters to the object properties, thereby handling the complexity for the scene designer. Thus, the parser does not just set up the objects, but also sets attributes on the objects. Note that the parser actually instantiates a builder to create the objects, since objects are immutable.

Because the same rendering model is shared between the element level and the API level, many of the objects are essentially the same. This makes parsing/translation highly efficient, and also allows different types of programming languages (e.g., C#-like languages) the ability to easily convert from the markup to its own syntax, and vice-versa. Note that as represented in FIG. 26, another such programming language 2610 can add elements to the element tree 208, or can directly interface with the visual API layer 212.

As also represented in FIG. 26 and in accordance with an aspect of the present invention, the same markup 2602 may be used to program at an element level and a resource level. As described above, the element level gives the scene designer full programmability, usage of the property system that provides inheritance (e.g., style-sheet like features), and eventing (e.g., whereby an element may have attached code to change its appearance, position and so forth in response to a user input event). However, the present invention also provides a resource-level mechanism by which scene designers can essentially shortcut the element tree and presenter system and program directly to the visual API layer. For many types of static shapes, images and the like where element-level features are not needed, this provides a more efficient and lightweight way to output the appropriate object. To this end, the parser recognizes when a fill of type "visual brush" is present, and directly calls the API layer 212 with resource level data 2612 to create the object. In other words, as represented in FIG. 22, element level vector graphics get parsed into created elements, which need later translation to the objects, while resource level vector graphics get parsed and directly stored in an efficient manner.

By way of example, the following markup is directly derived from the object model for the LinearGradient object, and fills an outer circle with a VisualBrush. The contents of that VisualBrush are defined by the inner markup. Note that this syntax is commonly used for expressing various brushes, transforms and animations:

```
<Circle CenterX="10" CenterY="10" Radius="5">
    <Circle.Fill>
        <VisualBrush xmlns="...">
            <Circle CenterX="0.5" CenterY="0.5" Radius="0.25"
            Fill="Blue"/>
            <Circle CenterX="0.6" CenterY="0.6" Radius="0.25"
            Fill="Green"/>
            <Circle CenterX="0.7" CenterY="0.7" Radius="0.25"
            Fill="Red"/>
            <Circle CenterX="0.8" CenterY="0.8" Radius="0.25"
            Fill="LemonChiffon"/>
        </VisualBrush>
    </Circle.Fill>
</Circle>
```

Note that while these visual brush-filled objects are efficiently stored, the resource level data (or the objects created thereby) can be referenced by elements and part of the element tree 208, as generally represented in FIG. 26. To this end, these visual brush resources may be named (e.g., with a name, reference or other suitable identifier) and referenced like other resources described via the complex property syntax.

Turning to an explanation of the canvas, as mentioned above in one alternative implementation, shapes may be kept lightweight and thus may be required to be contained in a canvas. In this alternative implementation, when content is rendered, it is rendered onto an infinite, device-independent canvas which has an associated coordinate system. The canvas element may thus position content according to absolute coordinates. The canvas element can optionally define a viewport, which specifies clipping, a transform, a preferred aspect ratio and a way of mapping the viewport into a parent space. If there is no viewport established, the canvas element only specifies a grouping of drawing primitives and can set up a transform, opacity and other compositing attributes.

The following is a markup example for a sample canvas:

```
<Canvas Background="black" Top="100" Left="100"
Height="600" Width="800">
    <Rectangle Top="600" Left="100" Width="100"
    Height="50" Fill="red"
Stroke="blue" StrokeWidth="10"/>
    <Line x1="100" y1="300" x2="300" y2="100"
    Stroke="green" StrokeWidth="5"
/>
</Canvas>
```

Note that in one implementation, when coordinates are specified without units then they are considered as "logical pixels" of 96ths of an inch, and in the above example, the line will be 200 pixels long. In addition to coordinates, other properties include width, height horizontal and vertical alignment, and ViewBox (of type rect; default is unset or (0,0,0,0), meaning no adjustment is made, and the stretch and align properties get ignored). As generally described above with reference to FIGS. 18-20, other properties include stretch, which when not specified preserves original size, or can 1) specify a fill in which the aspect ratio is not preserved and the content is scaled to fill the bounds established by the top/left/width/height, 2) specify uniform, which scales size uniformly until the image fits the bounds established by the top/left/width/height, or 3) specify UniformToFill, which scales size uniformly to fill the bounds established by top/left/width/height, and clips as necessary.

To further correlate with the lower-level object model, the transform property establishes a new coordinate frame for the children of the element, while the clip property restricts the region to which content can be drawn on the canvas, with the default clipping path defined as the bounding box. The ZIndex property can be used to specify rendering order for nested canvas elements within a panel.

The Viewbox specifies a new coordinate system for the contents, e.g., by redefining the extent and origin of the viewport. Stretch helps to specify how those contents map into the viewport. The value of the viewBox attribute is a list of four "unitless" numbers <min-x>, <min-y>, <width> and <height>, e.g., separated by whitespace and/or a comma, and is of type Rect. The Viewbox rect specifies the rectangle in user space that maps to the bounding box. It works the same as inserting a scaleX and scaleY. The stretch property (in case the option is other than none) provides additional control for preserving the aspect ratio of the graphics. An additional transformation is applied to descendants of the given element to achieve the specified effect.

In the example above, the effective result of the rectangle in the markup sample above under each stretch rule would be:

```
None - from (100, 600) to (200, 650)
Fill - from (100, 100) to (900, 700)
Uniform - from (100, ?) to (900, ?) - the new height will be
400, and it will centered based on HorizontalAlign and
VerticalAlign.
UniformToFill - from (?, 100) to (?, 700) The new width is
1200, and will again be centered based on HorizontalAlign and
VerticalAlign.
```

If there is a transform on the canvas, it is essentially applied above (e.g., in the tree) the mapping to ViewBox. Note that this mapping will stretch any of the elements in a canvas, e.g., boxes, text, and so forth, not just shapes. Further, note that if a viewbox is specified, the canvas no longer sizes to its contents, but rather has a specified size. If y-width and y-height are also specified, then the stretch/align properties are used to fit the viewbox into the specified width and height.

The elements in the object model can each have a 'Clip' attribute applied. On some elements, notably shapes, this is exposed directly as a common language runtime property, while on others (e.g., most controls) this property is set via a DynamicProperty.

Figure 27:
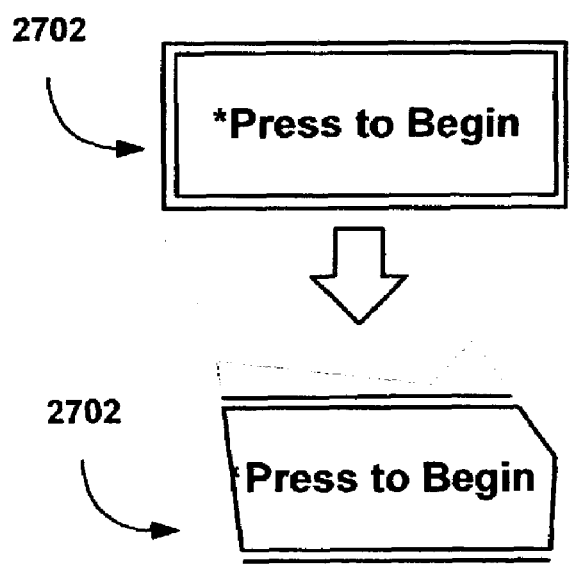
FIG. 27 is a representation of clipping via a geometry path in accordance with an aspect of the present invention.

In general, the clipping path restricts the region to which content can be drawn, as generally represented in FIG. 27 wherein a button is shown in an unclipped form 2702 and a form 2704 in which a clipping path is specified (where the dashed line represents the clipping path). Conceptually, any parts of the drawing that lie outside of the region bounded by the currently active clipping path are not drawn. A clipping path can be thought of as a mask wherein those pixels outside the clipping path are black with an alpha value of zero and those pixels inside the clipping path are white with an alpha value of one (with the possible exception of anti-aliasing along the edge of the silhouette).

A clipping path is defined by a Geometry object, either inline or more typically in a resource section. A clipping path is used and/or referenced using the "Clip" property on an element, as shown in the following example:

```
<def:Resources>
    <Geometry def:ID="MyClip">
        <Path Data="..." />
        <Rectangle ...   />
    </Geometry>
</def:Resources>
<Element Clip=""%resource; MyClip"   ... />
```

Note that animating a Clip is similar to animating transforms:

```
<Element>
    <Element.Clip>
        <Circle ..../>
        <Rectangle .... >
            <FloatAnimation ... />
        </Rectangle>
    </Element.Clip>
    ... children ...
</Element>
```

A path is drawn by specifying the 'Geometry' data and the rendering properties, such as Fill, Stroke, and StrokeWidth on the Path element. An example markup for a path is specified as follows:

```
<Path Data="M 100 100 L 300 100 L 200 300 z"
Fill="red" Stroke="blue" StrokeWidth="3" />
```

The path 'Data' string is of type Geometry. A more verbose and complete way to specify a drawn path is via the complex property syntax, as described above. The markup (such as in the following example) is fed directly into the Geometry builder classes described above:

```
<Path>
    <Path.Data>
        <CircleGeometry ... />
        <RectangleGeometry ... />
        <PathGeometry ... />
    </Path.Data>
    <Path.Fill value="red" />
    <Path.Stroke value="blue"/>
</Path>
```

The path data string is also described, using the following notation to describe the grammar for a path data string:

```
*: 0 or more
+: 1 or more
?: 0 or 1
( ): grouping
|: separates alternatives
double quotes surround literals
```

The following shows the path data string information described with this notation (note that in one implementation, FillMode may be specified here, instead of a property at the element level):

wvg-path:
    wsp* moveto-drawto-command-groups? wsp*
moveto-drawto-command-groups:
    moveto-drawto-command-group
    | moveto-drawto-command-group wsp* moveto-drawto-command-groups
moveto-drawto-command-group:
    moveto wsp* drawto-commands?
drawto-commands:
    drawto-command
    | drawto-command wsp* drawto-commands
drawto-command:
    closepath
    | lineto
    | horizontal-lineto
    | vertical-lineto
    | curveto
    | smooth-curveto
    | quadratic-bezier-curveto
    | smooth-quadratic-bezier-curveto
    | elliptical-arc
moveto:
    ( "M" | "m" ) wsp* moveto-argument-sequence
moveto-argument-sequence:
    coordinate-pair
    | coordinate-pair comma-wsp? lineto-argument-sequence
closepath:
    ( "Z" | "z" )
lineto:
    ( "L" | "l" ) wsp* lineto-argument-sequence
lineto-argument-sequence:
    coordinate-pair
    | coordinate-pair comma-wsp? lineto-argument-sequence
horizontal-lineto:
    ( "H" | "h" ) wsp* horizontal-lineto-argument-sequence
horizontal-lineto-argument-sequence:
    coordinate
    | coordinate comma-wsp? horizontal-lineto-argument-sequence
vertical-lineto:
    ( "V" | "v" ) wsp* vertical-lineto-argument-sequence
vertical-lineto-argument-sequence:
    coordinate
    | coordinate comma-wsp? vertical-lineto-argument-sequence
curveto:
    ( "C" | "c" ) wsp* curveto-argument-sequence
curveto-argument-sequence:
    curveto-argument
    | curveto-argument comma-wsp? curveto-argument-sequence
curveto-argument:
    coordinate-pair comma-wsp? coordinate-pair comma-wsp? coordinate-pair
smooth-curveto:
    ( "S" | "s" ) wsp* smooth-curveto-argument-sequence
smooth-curveto-argument-sequence:
    smooth-curveto-argument
    | smooth-curveto-argument comma-wsp? smooth-curveto-

```
argument-sequence
smooth-curveto-argument:
    coordinate-pair comma-wsp? coordinate-pair
quadratic-bezier-curveto:
    ( "Q" | "q" ) wsp* quadratic-bezier-curveto-argument-
sequence
quadratic-bezier-curveto-argument-sequence:
    quadratic-bezier-curveto-argument
    | quadratic-bezier-curveto-argument comma-wsp?
        quadratic-bezier-curveto-argument-sequence
quadratic-bezier-curveto-argument:
    coordinate-pair comma-wsp? coordinate-pair
smooth-quadratic-bezier-curveto:
    ( "T" | "t" ) wsp* smooth-quadratic-bezier-curveto-
argument-sequence
smooth-quadratic-bezier-curveto-argument-sequence:
    coordinate-pair
    | coordinate-pair comma-wsp? smooth-quadratic-bezier-
curveto-argument-sequence
elliptical-arc:
    ( "A" | "a" ) wsp* elliptical-arc-argument-sequence
elliptical-arc-argument-sequence:
    elliptical-arc-argument
    | elliptical-arc-argument comma-wsp? elliptical-arc-
argument-sequence
elliptical-arc-argument:
    nonnegative-number comma-wsp? nonnegative-number comma-
wsp?
        number comma-wsp flag comma-wsp flag comma-wsp
coordinate-pair
coordinate-pair:
    coordinate comma-wsp? coordinate
coordinate:
    number
nonnegative-number:
    integer-constant
    | floating-point-constant
number:
    sign? integer-constant
    | sign? floating-point-constant
flag:
    "0" | "1"
comma-wsp:
    (wsp+ comma? wsp*) | (comma wsp*)
comma:
    ","
integer-constant:
    digit-sequence
floating-point-constant:
    fractional-constant exponent?
    | digit-sequence exponent
fractional-constant:
    digit-sequence? "." digit-sequence
    | digit-sequence "."
exponent:
    ( "e" | "E" ) sign? digit-sequence
sign:
    "+" | "−"
digit-sequence:
    digit
    | digit digit-sequence
digit:
    "0" | "1" | "2" | "3" | "4" | "5" | "6" | "7" | "8" | "9"
wsp:
    (#x20 | #x9 | #xD | #xA)
```

The image element (FIG. 25) indicates that the contents of a complete file are to be rendered into a given rectangle within the current user coordinate system. The image (indicated by the image tag) can refer to raster image files such as PNG or JPEG, or to files with MIME type of "image/wvg", as set forth in the following example:

```
<Image Top="200" Left="200" Width="100px" Height="100px"
Source ="myimage.png">
</Image>
```

The following table provides information on some example properties for images:

| Name | Type | R/RW | Default Value | Description |
|---|---|---|---|---|
| Top | BoxUnit | | | Coordinate for the top side of the Image |
| Left | BoxUnit | | | Coordinate for the left side of the Image |
| Width | BoxUnit | | | Width of the Image |
| Height | BoxUnit | | | Height of the Image |
| Source | ImageData | | | Source of the Image |
| Dpi | Float | | 96(?) | Target DPI to use for sizing |
| HorizontalAlign | enum { Left (?), Center (?), Right (?) } | | Center | |
| VerticalAlign | enum { Top (?), Middle (?), Bottom(?) } | | Middle | |
| Stretch | enum Stretch { None, Fill, Uniform, UniformToFill } | | None | None: Preserve original size Fill: Aspect ratio is not preserved and the content is scaled to fill the bounds established by tlbh Uniform Scale size uniformly until the image fits the bounds established by the tlwh. |

-continued

| Name | Type | R/RW | Default Value | Description |
|---|---|---|---|---|
| | | | | UniformToFill: Scale size uniformly to fill the bounds established by tlbh, and clipped. |
| ReadyState | enum { MetaDataReady, Loading, Loaded LoadError } | | | |
| LoadCounter | Int | Read | Null | Counter that increments when ReadyState is Loading |
| Name | String | | | Alternate text for the Image. |

As described above, shapes correspond to geometry drawn with inherited and cascaded presentation properties. The following tables set forth example shape properties for the basic shape elements described above (Rectangle, Ellipse, Line, Polyline, Polygon). Note that these basic shapes may have stroke properties, fill properties, and used as clip paths, have inheritance characteristics, and apply to both the element and Resource levels:

| Name | Type | R/RW | Default Value | Description |
|---|---|---|---|---|
| Fill | Brush | RW | null | Coordinate for the top side of the rect |
| FillOpacity | Float | RW | 1.0 | Coordinate for the left side of the rect |
| Stroke | Brush | RW | null | Width of the rect |
| StrokeOpacity | Float | RW | 1.0 | Height of the rect |
| StrokeWidth | BoxUnit | RW | 1 px | Width of the stroke. 1 px = 1/96 of an inch |
| FillRule | enum { EvenOdd, NonZero } | RW | EvenOdd | FillRule indicates the algorithm which is to be used to determine what parts of the canvas are included inside the shape. |
| StrokeLineCap | enum { Butt, Round, Square, Diamond } | RW | Butt | StrokeLineCap specifies the shape to be used at the end of open subpaths when they are stroked. |
| StrokeLineJoint | enum { Miter, Round, Bevel } | RW | Miter | StrokeLineJoin specifies the shape to be used at the corners of paths (or other vector shapes) that are stroked when they are stroked. |
| StrokeMiterLimit | Float | RW | 4.0 | The limit on the ratio of the MiterLength to the StrokeWidth. Value to be >= 1 |
| StrokeDashArray | PointList | RW | null | StrokeDashArray controls the pattern of dashes and gaps used to stroke paths. <dasharray> contains a list of space- or comma-separated <number>s that specify the lengths of alternating dashes and gaps in user units. If an odd number of values is provided, then the list of values is repeated to yield an even number of values. Thus, stroke-dasharray: 5 3 2 is equivalent to stroke-dasharray: 5 3 2 5 3 2. |
| StrokeDashOffset | Point | RW | | StrokeDashoffset specifies the distance into the dash pattern to start the dash. |
| Transform | Transform | RW | null | Transform establishes a new coordinate frame for the children of the element |

| Name | Type | R/RW | Default Value | Description |
|---|---|---|---|---|
| Clip | Geometry | RW | null | Clip restricts the region to which paint can be applied on the canvas. The default clipping path is defined as the bounding box. |

The following is an example markup syntax for a rectangle:

```
<Rectangle Top="600" Left="100" Width="100" Height="50"
Fill="red" Stroke="blue" StrokeWidth="10"/>
```

A rectangle has the following properties in the object model (note that rectangles are read/write, have default values equal to zero, support inheritance and apply to both the element and Resource levels):

| Name | Type | Description |
|---|---|---|
| Top | BoxUnit | Coordinate for the top side of the rect |
| Left | BoxUnit | Coordinate for the left side of the rect |
| Width | BoxUnit | Width of the rect |
| Height | BoxUnit | Height of the rect |
| RadiusX | BoxUnit | For rounded rectangles, the X-axis radius of the ellipse used to round off the corners of the rectangle. If a negative X-axis radius is specified, the absolute value of the radius will be used. |
| RadiusY | BoxUnit | For rounded rectangles, the Y-axis radius of the ellipse used to round off the corners of the rectangle. If a negative X-axis radius is specified, the absolute value of the radius will be used. |

The following is an example markup syntax for a circle:

```
<Circle CenterX="600" CenterY="100" Fill="red"
Stroke="blue" StrokeWidth="10"/>
```

A circle has the following properties in the object model (note that circles are read/write, have default values equal to zero, support inheritance and apply to both the element and Resource levels):

| Name | Type | Description |
|---|---|---|
| CenterX | BoxUnit | X coordinate of the center of the circle |
| CenterY | BoxUnit | X coordinate of the center of the circle |
| Radius | BoxUnit | Radius of the circle |

The following is an example markup syntax for an ellipse:

```
<Ellipse CenterX="600" CenterY="100" Fill="red"
Stroke="blue" StrokeWidth="10"/>
```

An ellipse has the following properties in the object model (note that ellipses are read/write, have default values equal to zero, support inheritance and apply to both the element and Resource levels):

| Name | Type | Description |
|---|---|---|
| CenterX | Coordinate | X coordinate of the center of the ellipse |
| CenterY | Coordinate | X coordinate of the center of the ellipse |
| RadiusX | Length | The X-axis radius of the ellipse. If a negative X-axis radius is specified, the absolute value of the radius will be used. |
| RadiusY | Length | The Y-axis radius of the ellipse. If a negative Y-axis radius is specified, the absolute value of the radius will be used. |

The following is an example markup syntax for a line:

```
<Line xl="100" yl="300" x2="300" y2="100"
StrokeWidth="5" />
```

A line has the following properties in the object model (note that lines are read/write, have default values equal to zero, support inheritance and apply to both the element and Resource levels):

| Name | Type | Description |
|---|---|---|
| X1 | BoxUnit | The X-axis coordinate of the start of the line. The default value is "0". |
| Y1 | BoxUnit | The Y-axis coordinate of the start of the line. The default value is "0". |
| X2 | BoxUnit | The X-axis coordinate of the end of the line. The default value is "0". |
| Y2 | BoxUnit | The Y-axis coordinate of the end of the line. The default value is "0". |

The 'Polyline' defines a set of connected straight line segments. Typically, a 'Polyline' defines an open shape.

The following is an example markup syntax for a polyline:

```
<Polyline Fill="None" Stroke="Blue" StrokeWidth="10cm"
Points="50,375
150,375 150,325 250,325 250,375
350,375 350,250 450,250 450,375
550,375 550,175 650,175 650,375
750,375 750,100 850,100 850,375
950,375 950,25 1050,25 1050,375
1150,375" />
```

A polyline has the following properties in the object model (note that lines are read/write, have default values equal to null, support inheritance and apply to both the element and Resource levels):

| Name | Type | Description |
|---|---|---|
| Points | PointCollection | The points that make up the Polyline. Coordinate values are in the user coordinate system. |

The Polygon element defines a closed shape comprising a set of connected straight line segments. The following is an example markup syntax for a polygon:

```
<Polygon Fill="red" Stroke="blue" StrokeWidth="10"
    points="350,75 379,161 469,161 397,215
    423,301 350,250 277,301 303,215
    231,161 321,161" />
```

A polygon has the following properties in the object model (note that lines are read/write, have default values equal to null, support inheritance and apply to both the element and Resource levels):

| Name | Type | Description |
|---|---|---|
| Points | PointCollection | The points that make up the Polygon. Coordinate values are in the user coordinate system. If an odd number of coordinates are provided, then the element is in error. |

The grammar for points specifications in 'polyline' and 'polygon' elements is described with the following notation:

```
*: 0 or more
+: 1 or more
?: 0 or 1
( ): grouping
|: separates alternatives
double quotes surround literals
```

The following describes the points specifications in 'Polyline' and 'Polygon' elements using the above notation:

```
list-of-points:
    wsp* coordinate-pairs? wsp*
coordinate-pairs:
    coordinate-pair
    | coordinate-pair comma-wsp coordinate-pairs
coordinate-pair:
    coordinate comma-wsp coordinate
coordinate:
    number
number:
    sign? integer-constant
    | sign? floating-point-constant
comma-wsp:
    (wsp+ comma? wsp*) | (comma wsp*)
comma:
    ","
integer-constant:
    digit-sequence
floating-point-constant:
    fractional-constant exponent?
    | digit-sequence exponent
fractional-constant:
    digit-sequence? "." digit-sequence
    | digit-sequence "."
exponent:
    ( "e" | "E" ) sign? digit-sequence
sign:
    "+" | "−"
digit-sequence:
    digit
    | digit digit-sequence
digit:
    "0" | "1" | "2" | "3" | "4" | "5" | "6" | "7" | "8" | "9"
wsp:
    (#x20 | #x9 | #xD | #xA)+
```

CONCLUSION

As can be seen from the foregoing detailed description, there is provided a system, method and element/object model that provide program code various mechanisms to interface with a scene graph. The system, method and object model are straightforward to use, yet powerful, flexible and extensible.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented system for composing computer-displayable graphics, the system comprising:

a high-level compositing and animation engine and a low-level engine, the high-level engine being instantiated on a per-application basis and the low-level engine servicing requests from multiple applications;

a markup language, the markup language comprising graphics instructions, the graphics instructions comprising a string format and an object notation, the object notation comprising graphics elements from a graphics element class;

a graphics object model comprising:

a base class visual object which is a container for graphical content, which provides base functionality for other visual types and from which other visual types derive, a container visual object which is a container for visuals and which may contain other container visual objects, a drawing visual object which is a container for graphical content, and a graphics element class, the element class comprising a shape class, an image class, a video class, and a canvas class, and the element class being integrated with a general property system;

a type converter, the type converter configured to convert a graphics instruction in string format to a visual application programming interface (API) object;

a parser/translator, the parser/translator configured to
  a) interpret graphics instructions, the graphics instructions comprising direct code calls, object model code calls, and graphics instructions written using the markup language,
  b) access the type converter, the type converter configured to convert a graphics instruction in string format to a visual API object, and
  c) interpret the markup code and, upon interpreting the markup code, add elements of the graphics elements class to an element tree;
a presenter system, the presenter system configured to translate graphics element trees into calls to a visual API;
a visual API, the visual API configured to
  a) interface with the presenter system, interface with the parser/translator, and interface with direct code calls from programming languages, and
  b) in response to requests from the presenter system, the parser/translator, creates scene objects within a scene graph; and
a display interface operable to facilitate display of the graphics objects within the scene graph.

2. The system of claim 1 wherein the elements of the element object model correlate with the objects of the scene graph object model.

3. The system of claim 1 wherein the markup includes inline text including a string that defines an element property, and the translator communicates with a type converter to convert the string to an object property.

4. The system of claim 1 wherein the markup includes inline text comprising property syntax, the property syntax specifying multiple attributes of vector graphics objects.

5. The system of claim 4 wherein the in line text is identified with a reference that is referred to at another location in the markup.

6. The system of claim 4 wherein the inline text is identified with a reference that refers to a file.

7. The system of claim 4 wherein the inline text is identified with a reference that corresponds to a file that may be downloaded from a remote location in a network.

8. The system of claim 1 wherein the markup includes inline text comprising complex property syntax corresponding to a graphical resource.

9. The system of claim 8 wherein the graphical resource describes a visual brush object, the parser/translator providing resource level data for directly communicating with the visual application programming interface layer to create a visual paint object corresponding to the element described by the complex property syntax.

10. The system of claim 9 wherein the resource level data is identified with a reference that is referred to at another location in the markup.

11. The system of claim 9 wherein the resource level data is identified with a reference that refers to a file.

12. The system of claim 9 wherein the resource level data is identified with a reference that refers to a file that may be downloaded from a remote location in a network.

13. The system of claim 1 wherein one of the elements of the graphics object model comprises an image element.

14. The system of claim 1 wherein one of the graphics elements comprises a polyline element.

15. The system of claim 1 wherein one of the graphics elements comprises a polygon element.

16. The system of claim 1 wherein one of the graphics elements comprises a path element.

17. The system of claim 1 wherein one of the graphics elements comprises a line element.

18. The system of claim 1 wherein one of the graphics elements comprises an ellipse element.

19. The system of claim 1 wherein one of the graphics elements comprises a circle element.

20. The system of claim 1 wherein one of the graphics elements includes fill property data.

21. The system of claim 1 wherein one of the graphics elements includes stroke property data.

22. The system of claim 1 wherein one of the graphics elements includes clipping property data.

23. The system of claim 1 wherein one of the graphics elements includes transform property data.

24. The system of claim 1 wherein one of the graphics elements includes effect data.

25. The system of claim 1 wherein one of the graphics elements includes opacity data.

26. The system of claim 1 wherein one of the graphics elements includes blend mode data.

27. The system of claim 1 wherein the translator requests instantiation of at least one builder to create the objects.

* * * * *